United States Patent
Kitchen et al.

(10) Patent No.: US 11,760,005 B2
(45) Date of Patent: Sep. 19, 2023

(54) RESIN ADHESION FAILURE DETECTION

(71) Applicant: BWXT Advanced Technologies LLC, Lynchburg, VA (US)

(72) Inventors: Ryan Scott Kitchen, Knoxville, TN (US); Benjamin D. Fisher, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 5 days.

(21) Appl. No.: 16/951,543

(22) Filed: Nov. 18, 2020

(65) Prior Publication Data

US 2021/0170676 A1    Jun. 10, 2021

Related U.S. Application Data

(60) Provisional application No. 62/941,183, filed on Nov. 27, 2019.

(51) Int. Cl.
    *B29C 67/00* (2017.01)
    *B29C 64/129* (2017.01)
    (Continued)

(52) U.S. Cl.
    CPC ............ *B29C 64/129* (2017.08); *B22F 10/85* (2021.01); *B22F 12/90* (2021.01); *B29C 64/268* (2017.08);
    (Continued)

(58) Field of Classification Search
    CPC ... B29C 64/129; B29C 64/393; B29C 64/268; B33Y 10/00; B33Y 50/02; G06T 7/62;
    (Continued)

(56) References Cited

U.S. PATENT DOCUMENTS

2007/0089479 A1    4/2007    Vaccaro et al.
2007/0212483 A1    9/2007    Miyashita et al.
(Continued)

FOREIGN PATENT DOCUMENTS

WO    2019/164617 A2    8/2019

OTHER PUBLICATIONS

International Preliminary Report on Patentability dated Jun. 9, 2022 in PCT/US2020/061411.
(Continued)

*Primary Examiner* — Ryan M Ochylski
(74) *Attorney, Agent, or Firm* — Morgan, Lewis & Bockius LLP

(57) ABSTRACT

Methods to in-situ monitor production of additive manufacturing products collects images from the deposition process on a layer-by-layer basis, including a void image of the pattern left in a slurry layer after deposition of a layer and a displacement image formed by immersing the just-deposited layer in a renewed slurry layer. Image properties of the void image and displacement image are corrected and then compared to a binary expected image from a computer generated model to identify defects in the just-deposited layer on a layer-by-layer basis. Additional methods use the output from the comparison to form a 3D model corresponding to at least a portion of the additive manufacturing product. Components to control the additive manufacturing operation based on digital model data and to in-situ monitor successive layers for manufacturing defects can be embodied in a computer system or computer-aided machine, such as a computer controlled additive manufacturing machine.

14 Claims, 27 Drawing Sheets

(51) Int. Cl.
    *B29C 64/268* (2017.01)
    *B29C 64/393* (2017.01)
    *B33Y 10/00* (2015.01)
    *G06T 7/00* (2017.01)
    *G06T 7/62* (2017.01)
    *B33Y 50/02* (2015.01)
    *B22F 12/90* (2021.01)
    *B22F 10/85* (2021.01)
    *B22F 10/28* (2021.01)

(52) U.S. Cl.
    CPC ............ *B29C 64/393* (2017.08); *B33Y 10/00* (2014.12); *B33Y 50/02* (2014.12); *G06T 7/001* (2013.01); *G06T 7/0008* (2013.01); *G06T 7/62* (2017.01); *B22F 10/28* (2021.01); *G06T 2207/30164* (2013.01)

(58) Field of Classification Search
    CPC .................. G06T 7/0008; G06T 7/001; G06T 2207/30164
    See application file for complete search history.

(56) References Cited

U.S. PATENT DOCUMENTS

2017/0066185 A1* 3/2017 Ermoshkin ........... B29C 64/194
2018/0322621 A1 11/2018 Craeghs et al.
2018/0341248 A1 11/2018 Mehr et al.

OTHER PUBLICATIONS

Park et al. "In-process Layer Surface Inspection of SLA Products," Proceedings of SPIE—The International Society for Optical Engineering, Dec. 1998, retrieved from <URL: https://www.researchgate.net/publication/2334234_In-process_Layer_Surface_Inspection_of_SLA_Products>.

International Search Report and Written Opinion dated May 24, 2021 in PCT/US2020/61411.

"Interim, In Situ Additive Manufacturing Inspection", NASA Technology Solution (2017).

* cited by examiner

FIG. 5A
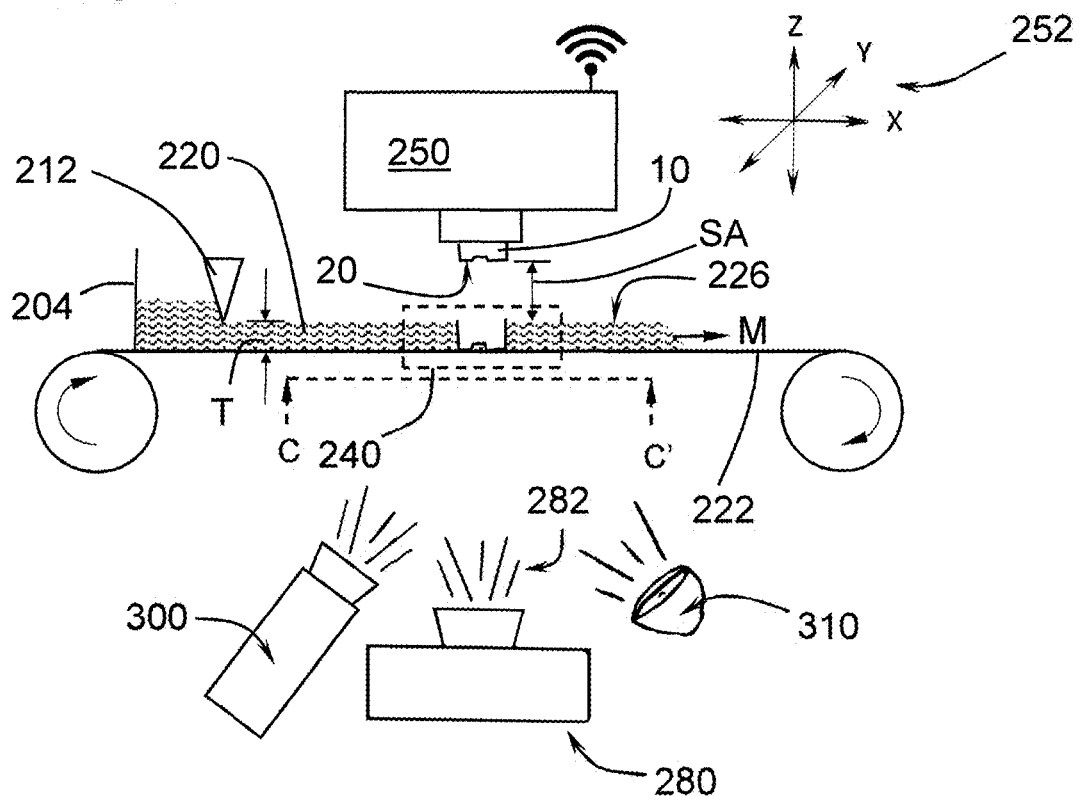
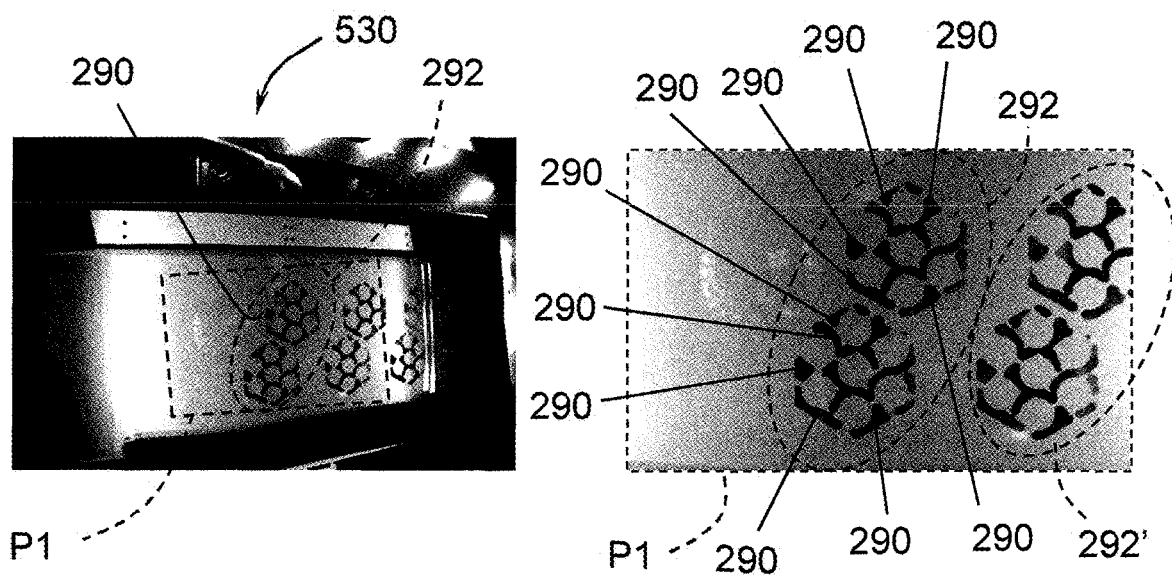
FIG. 5B
FIG. 5C

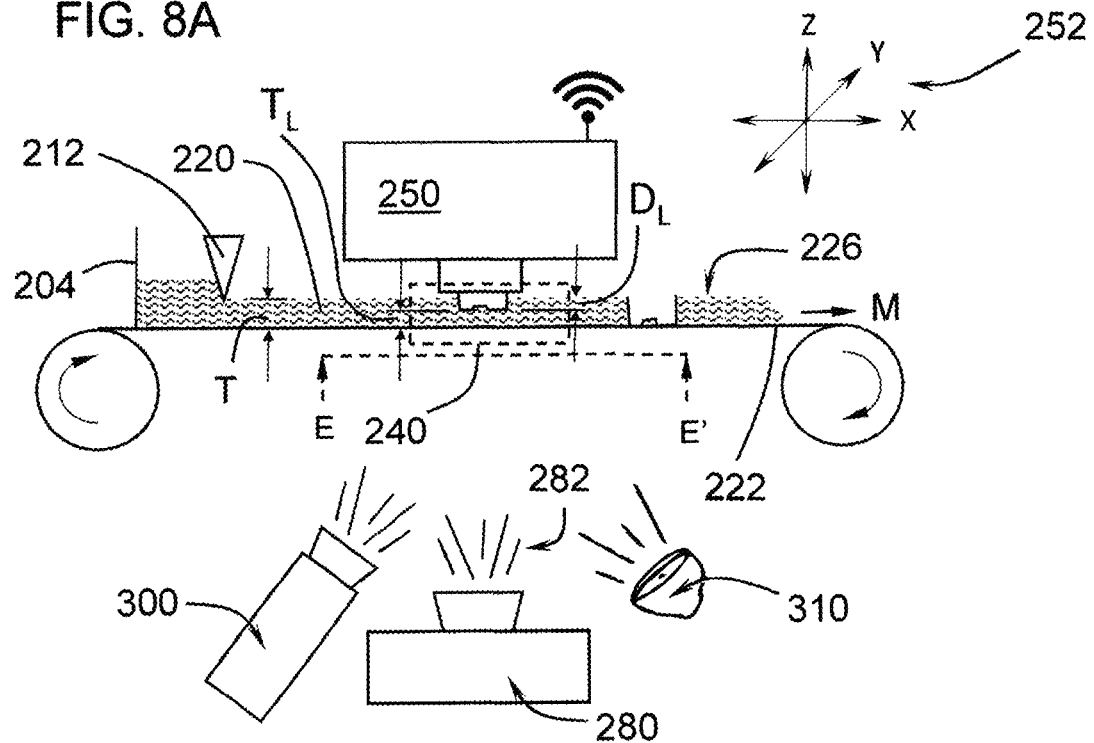
FIG. 8A
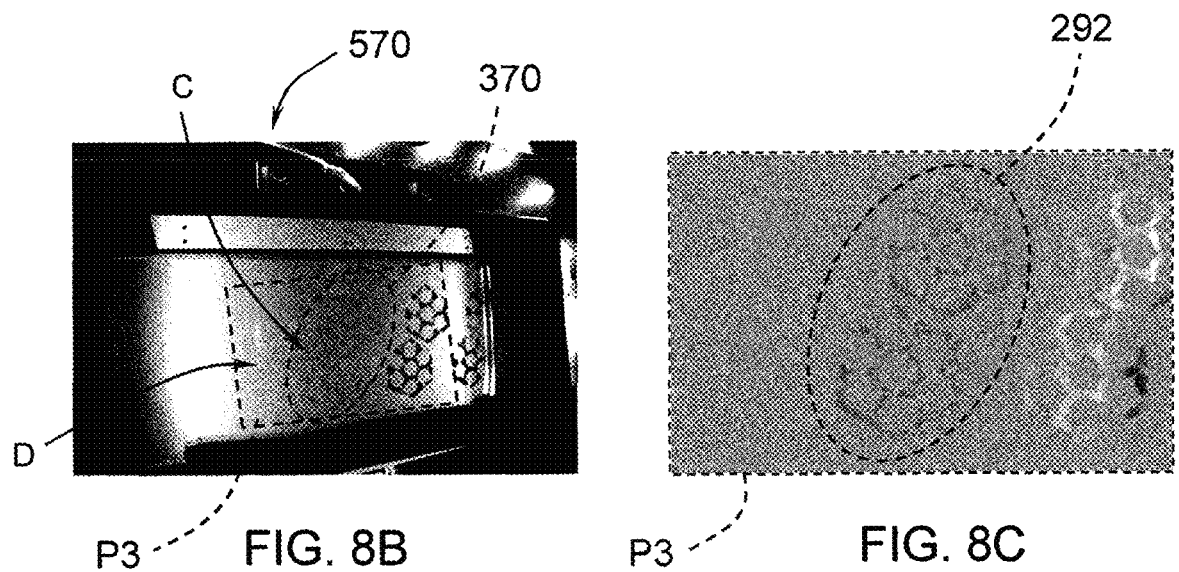
FIG. 8B
FIG. 8C

← 700

← 710

← 720

820

830

FIG. 17B  FIG. 17C  FIG. 17A
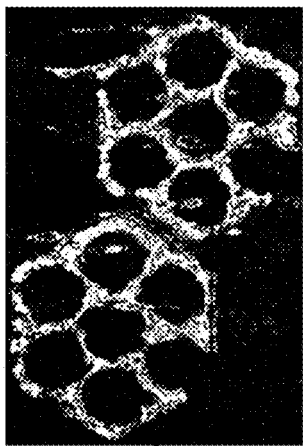
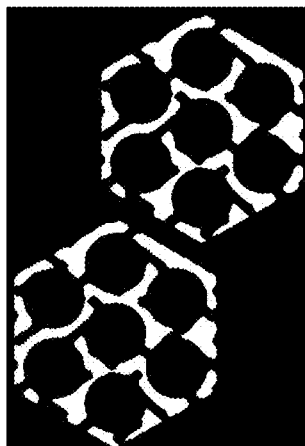
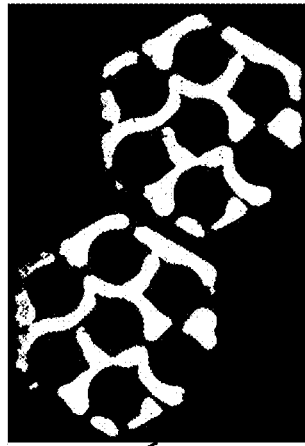
860  870  850
Compare
890
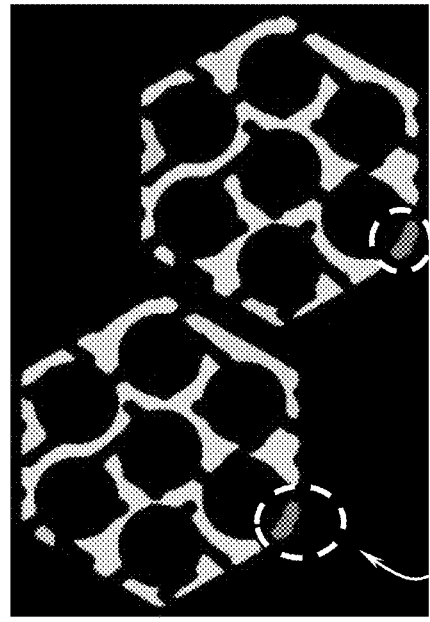
F1
880
F2
FIG. 17D

RESIN ADHESION FAILURE DETECTION

RELATED APPLICATION DATA

This application is based on and claims priority under 35 U.S.C. § 119 to U.S. Provisional Application No. 62/941,183, filed Nov. 27, 2019, the entire contents of which are incorporated herein by reference.

TECHNICAL FIELD AND INDUSTRIAL APPLICABILITY

The present disclosure relates generally to production of components from a slurry, such as a curable resin or ceramic composition, and detection of manufacturing defects in parts manufactured using the slurry. In particular, equipment and methods are disclosed for detecting slurry adhesion and curing when manufacturing a component using an additive manufacturing process, such as when manufacturing a component related to nuclear fission reactors using an additive manufacturing process.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

3D printers provide flexibility to manufacture various components based on computer-inputted designs. However, manufacturing methods using 3D printers suffer from failure-to-adhere delamination caused by a variety of factors. These factors include insufficient curing such as from insufficient UV exposure, lack of supporting structure such as when a volume of cured material does not have a pre-existing portion of the manufactured product on which to adhere, or improper resin formulation which contributes to improper curing or insufficient mechanical properties. Each factor can cause additively manufactured material to fail to adhere to a base component. Such failures can result in a manufactured component that does not meet the product specifications.

Inspection of manufactured components can be difficult. For example, detection and validation of an as-manufactured shape directly through imaging is often impractical due to the highly homogenous optical properties of the manufactured material versus those of the constituent materials. In another example, as-manufactured products can have shapes containing complex internal geometry which cannot be easily or accurately detected using ex-situ or post-build measurements, particularly optically-based measurements.

In addition, once a manufacturing defect is identified, such as an adhesion failure, there are no known technologies that can remediate such manufacturing defects.

SUMMARY

Considering the above, it would be advantageous to have equipment and methods to perform quality control during manufacture of resin-based manufactured components. Both detection of resin build quality, such as resin adhesion, and detection of curing defects, such as resin delamination, would improve manufacturing of components. In addition and relevant to additive manufacturing, in-situ measurement and print verification can provide means to perform quality control on complex shapes and structures and, optionally, to remediate such manufacturing defects as adhesion failure.

In general, the disclosure is directed to additive manufacturing methods for manufacturing components, particularly components of a nuclear fission reactor structure. In exemplary embodiments, the additive manufacturing method is based on deposition/curing technologies, and these technologies can be used to manufacture objects of almost any shape or geometry using digital model data from, for example, a 3D model or another electronic data source such as a computer-aided design (CAD) model, an Additive Manufacturing File (AMF) file, or a stereolithography contour (SLC) file (usually in sequential layers). Curing of liquid-based materials, e.g., slurries, can use different technologies, each of which solidifies or otherwise forms the liquid-based material in a layer-by-layer approach to build up the manufactured object. Examples include stereolithography (SL) utilizing various optical- or chemical-based curing processes (with associated opto-reactive or chemi-reactive materials). In exemplary embodiments, a method to in-situ monitor production of an additive manufacturing product can be integrated into the additive manufacturing method. The in-situ monitoring method compares images of the slurry during and after manufacturing a layer of the component and compares regions in those images to corresponding images derived from the digital model data for the corresponding layer. The presence or absence of a manufacturing defect, such as an adhesion defect in which material from the slurry volume has not adhered to the deposition surface, a delamination, or a failure to cure, is determined based on this comparison by applying a threshold criteria. Manufacturing defects can include, for example, an adhesion defect in which material from the slurry volume has not sufficiently adhered to the deposition surface. An adhesion defect is typically caused when the material adheres to the surface of the transport film stronger than to the printed part, and breaks off the surface when the part is lifted up. Other manufacturing defects can include, for example, a failure to cure, in which the resin was not cured (did not solidify) due to insufficient exposure or chemical problems, and a delamination, The comparison occurs iteratively on successively manufactured layers of the manufactured component.

Embodiments disclosed herein include methods to in-situ monitor production of an additive manufacturing product.

In a first embodiment, the method to in-situ monitor production of an additive manufacturing product comprises obtaining a first baseline image of a slurry for additive manufacturing in a first volume of slurry in a build zone of an additive manufacturing machine, forming a layer of the additive manufacturing product via an additive manufacturing process, detecting one or more defects in the layer using a void detection technique, obtaining a second baseline image of the slurry in a second volume of slurry in the build zone of the additive manufacturing machine, detecting one or more defects in the layer using a displacement detection technique, and analyzing an output of the void detection technique and the displacement detection technique to identify a presence or an absence of a manufacturing defect in the additive manufacturing product. In exemplary embodiments, the void detection technique includes, after forming the layer of the additive manufacturing product via an additive manufacturing process, withdrawing the additive manufacturing product from the first volume of slurry to a first withdrawn position, wherein, in the first withdrawn position, the last-formed layer is spaced apart from a plane containing a top surface of the first volume of slurry and spanning the build zone, and capturing a void image of the first volume of slurry in the build zone, wherein, in the void image, the additive manufacturing product is in the first withdrawn position and the first volume of slurry in the build zone is in a post-layer-formation condition that includes one or more voids in the first volume of slurry. In exemplary embodiments, the displacement detection technique includes immersing the additive manufacturing product into the second volume of slurry in the build zone, wherein, in a second immersed position, a surface of the last-formed layer is at a layer depth from the top surface of the second slurry volume, and wherein the layer depth is less than a thickness of the second volume of slurry in the build zone in an as-supplied condition, and capturing a displacement image of the second volume of slurry in the build zone, wherein, in the displacement image, the additive manufacturing product is in the second immersed position and the second volume of slurry in the build zone is in a pre-layer-formation condition that includes, relative to the second volume of slurry in an as-supplied condition, a reduced volume of slurry.

In a second embodiment, the method to in-situ monitor production of an additive manufacturing product comprises:
  forming a first portion of the additive manufacturing product in a first deposition step, wherein the additive manufacturing product is attached to a build stage of an additive manufacturing machine;
  supplying a first volume of a slurry for additive manufacturing to a build zone of the additive manufacturing machine;
  capturing a first image of the first slurry volume in the build zone, wherein, in the first image, the first slurry volume in the build zone is in an as-supplied condition and has a thickness between a top surface oriented toward the build stage of the additive manufacturing machine and a bottom surface oriented toward a curative radiation source of the additive manufacturing machine;
  immersing the additive manufacturing product into the first slurry volume in the build zone, wherein, in a first immersed position, the first portion of the additive manufacturing product is at a first layer depth ($D_{Ln}$) from the top surface of the first slurry volume, and wherein the first layer depth ($D_{Ln}$) is less than the thickness of the first slurry volume in the build zone in the as-supplied condition;
  forming a first layer ($L_a$) on a deposition surface of the first portion from at least a first portion of the first slurry volume located between the deposition surface and the bottom surface of the first slurry volume, wherein a distance between the deposition surface and the bottom surface of the first slurry volume defines a layer thickness ($T_{Ln}$) of the first layer ($L_n$);
  withdrawing the additive manufacturing product from the first slurry volume, wherein, in a first withdrawn position, the first layer ($L_n$) is spaced apart from a plane containing the top surface of the first slurry volume and spanning the build zone;
  capturing a second image of the first slurry volume in the build zone, wherein, in the second image, the additive manufacturing product is in the first withdrawn position and the first slurry volume in the build zone is in a post-layer-formation condition that includes one or more voids in the first slurry volume;
  supplying a second volume of a slurry for additive manufacturing to the build zone of the additive manufacturing machine;
  capturing a first image of the second slurry volume in the build zone, wherein, in the second image, the second slurry volume in the build zone is in an as-supplied condition and has a thickness between a top surface oriented toward the build stage of the additive manufacturing machine and a bottom surface oriented toward a curative radiation source of the additive manufacturing machine;
  immersing the additive manufacturing product into the second slurry volume in the build zone, wherein, in a second immersed position, a surface of the first layer ($L_n$) on which a second layer ($L_{n+1}$) will be deposited is at a second layer depth ($D_{Ln+1}$) from the top surface of the second slurry volume, and wherein the second layer depth ($D_{Ln+1}$) is less than the thickness of the second slurry volume in the build zone in the as-supplied condition;
  capturing a second image of the second slurry volume in the build zone, wherein, in the second image, the additive manufacturing product is in the second immersed position and the second slurry volume in the build zone is in a pre-layer-formation condition that includes, relative to the second slurry volume in an as-supplied condition, a reduced volume of second slurry;
  correcting image properties of the second image of the first slurry volume based on the first image of the first slurry volume to form a corrected void image;
  correcting image properties of the second image of the second slurry volume based on the first image of the second slurry volume to form a corrected displacement image; and
  comparing (a) the corrected void image to a binary expected image from a computer generated model and (b) the corrected displacement image to the binary expected image from the computer generated model, wherein the binary expected image from the computer generated model is of a layer in the additive manufacturing product corresponding to the first layer ($L_n$); and
  identifying a presence or an absence of a defect in the additive manufacturing product based on the step of comparing The disclosed methods can be embodied as instructions in non-transitory computer-readable storage medium storing instructions for execution by a process.

The disclosed methods are applicable to different types of additive manufacturing methods. For example, both the void detection technique and displacement detection technique disclosed herein are applicable to additive manufacturing methods that use a transport system for the slurry. Also for example, the displacement detection technique disclosed herein is applicable to additive manufacturing methods that use a vat-style deposition system for the slurry or that use laser curative radiation, for example, SLA and DLP vat-style deposition systems.

The disclosed method allows for in-situ iterative defect detection, which provides efficiencies in manufacturing (time and material) in that, for example, production of a component can be stopped and a part scrapped, if necessary. Additionally, a detected defect in one manufactured layer can be compensated for, corrected or "healed" by adjustment in a subsequent layer's manufacturing process (and such remediation can be confirmed in-situ before proceeding further with production of the component).

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIG. 5A schematically illustrates translating a build stage of an additive manufacturing machine from the immersion position to a withdrawn position in which the build stage is removed from the volume of liquid-based slurry materials, FIG. 5B is a corresponding example image, as seen from below the transporting film, of a layer of the liquid-based slurry material on the transporting film with the build stage at the withdrawn position and showing the voids remaining in the slurry layer, and FIG. 5C is a magnified and perspective corrected image corresponding to a portion of the image in FIG. 5B.

FIG. 8A schematically illustrates translating a build stage of an additive manufacturing machine from the withdrawn position to an immersion position in which the build stage is immersed into the volume of liquid-based slurry materials, FIG. 8B is a corresponding example image, as seen from below the transporting film, of a layer of the liquid-based slurry material on the transporting film with the build stage at the withdrawn position and showing the displacement in the slurry layer, and FIG. 8C is a magnified and perspective corrected image corresponding to a portion of the image in FIG. 8B.

FIGS. 17A to 17D are example images used in the comparison process, including, respectively, a binary void image, a binary displacement image, a binary expected image and a resulting, comparison image.

FIG. 21 is a block diagram illustrating an additive manufacturing machine (AMM) controller in accordance with some embodiments.

Figure 1:
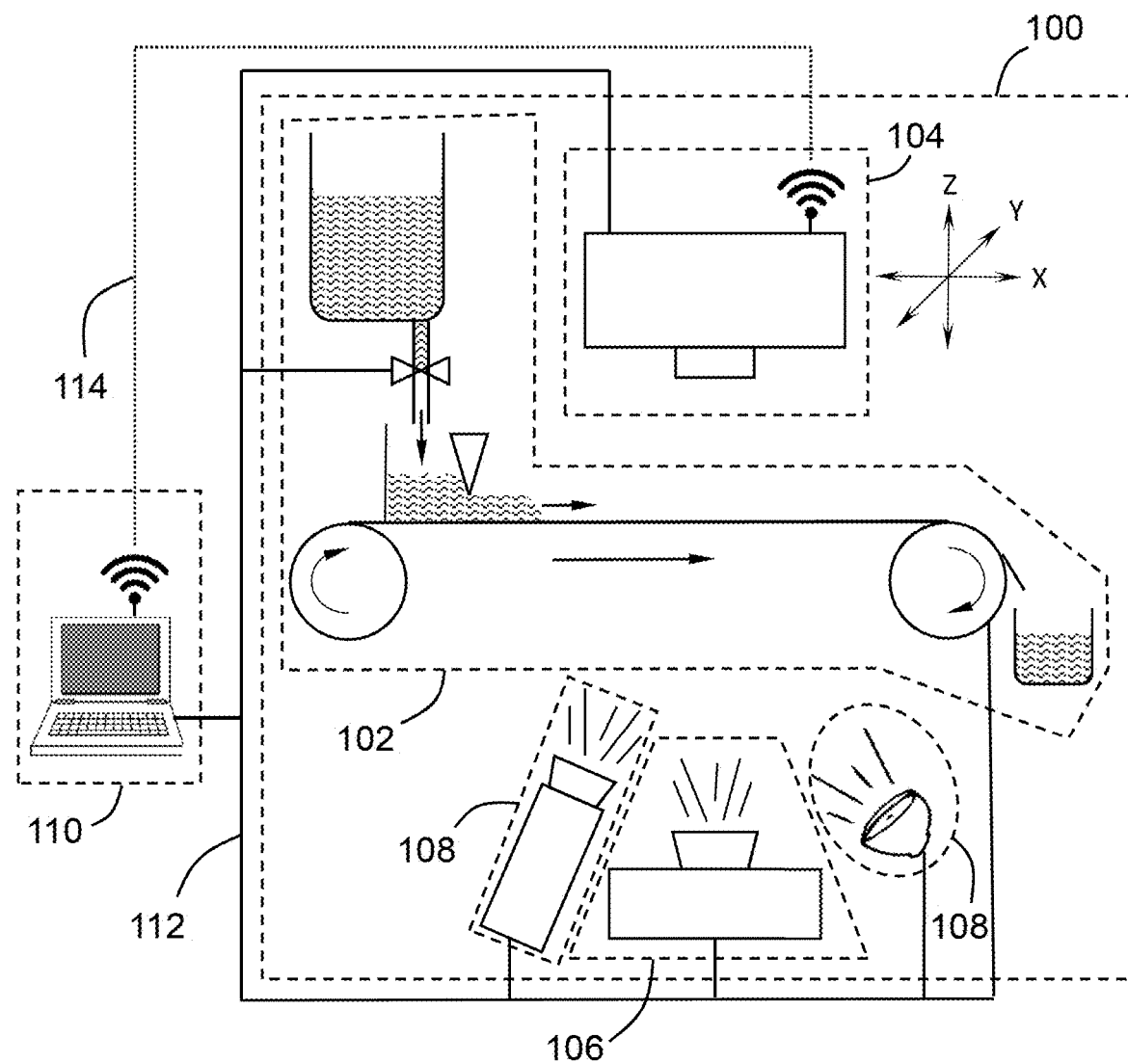
FIG. 1 is a schematic, block diagram of an additive manufacturing machine in accordance with some embodiments.

For ease of viewing, in some instances only some of the named features in the figures are labeled with reference numerals.

DETAILED DESCRIPTION

FIG. 1 is a schematic, block diagram of an additive manufacturing machine 100 in accordance with some embodiments. The additive manufacturing machine 100 includes a number of sub-units (also called "components") communicably coupled to operate the additive manufacturing machine 100 to manufacture an additive manufacturing product. Sub-units include, among other things, components 102 to supply a source of material to a build zone, components 104 on which the additive manufacturing product is built, components 106 to deposit or cure the material forming successive layers of the additive manufacturing product, components 108 to image the liquid-based materials during deposition of successive layers of the additive manufacturing product, and components 110 to control the additive manufacturing operation based on digital model data and to in-situ monitor the successive layers of the additive manufacturing product for manufacturing defects. Components 110 to control the additive manufacturing operation can be operatively connected to the various sub-units and components by suitable means, such as by digital connections transmitted via wired connections 112 or via wireless connections 114 or via a combination thereof. The various sub-units can be separate components or can be combined or otherwise share components.

Details of various sub-units are shown and described with reference to FIGS. 2A to 2E.

Figure 2A:
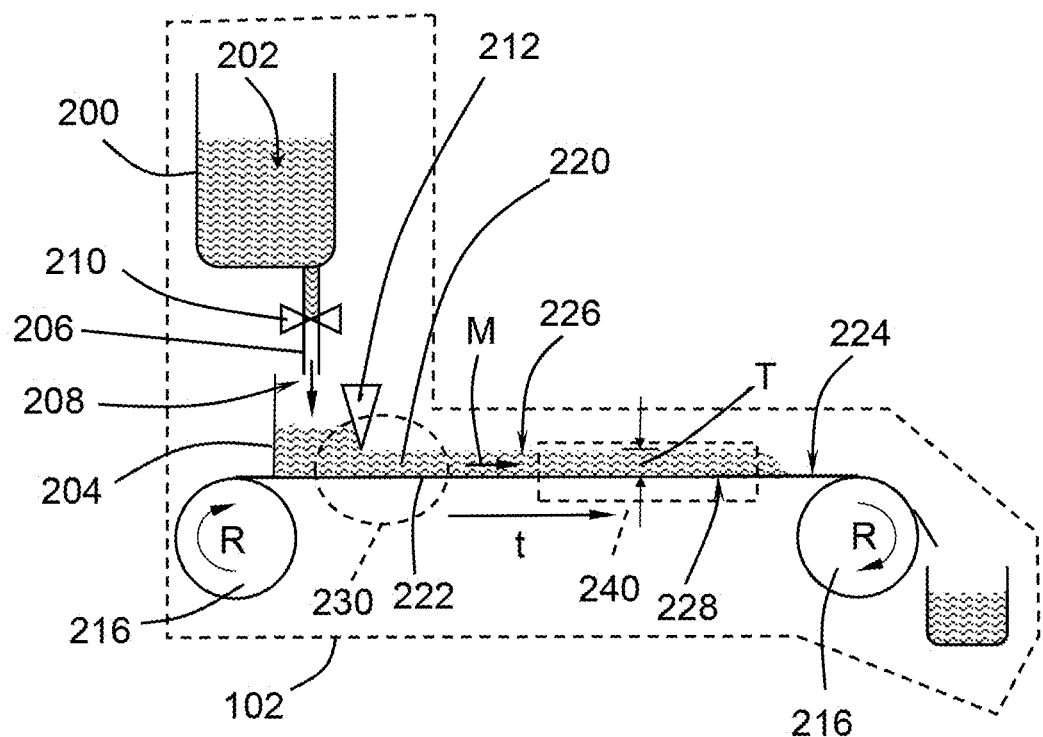
FIGS. 2A to 2E are schematic, block diagrams of various sub-units of the additive manufacturing machine shown in FIG. 1

For example, FIG. 2A schematically illustrates components 102 to supply a source of material to a build zone including a reservoir 200 that contains a supply of liquid-based materials 202, e.g., a slurry. The reservoir 200 is in fluid communication to an interim reservoir 204, for example, by tubing 206 having an entrance connected to the reservoir 200 and an exit 208 (directly or indirectly) into the interim reservoir 204. A valve 210 controls the flow of the liquid-based materials 202 to the interim reservoir 204. From the interim reservoir 204, the liquid-based materials 202 are formed into a thin, e.g., less than 100 micron, layer 220 of the liquid-based materials 202 on a transporting film 222 by a metering device 212, such as a doctor blade. The combination of an adequate volume of liquid-based materials 202 and the structural arrangement of the interim reservoir 204, the metering device 212 and the transporting film 222 provides an adequate head pressure to form a continuous volume of liquid-based materials 202 in the layer 220 on a first side 224 of the transporting film 222 as the transporting film 222 is translated (t) from the deposition zone 230 into and out from the build zone 240. Additionally, the layer 220 of the liquid-based materials 202 on the transporting film 222 has, throughout the length (L) and width (W) of the build zone 240, a thickness (T) relative to the first side 224 of the transporting film 222, e.g., between a top surface 226 oriented toward the build stage 250, such as toward a deposition surface 254 of the build stage 250 (see FIG. 2B), and a bottom surface 228 oriented toward a curative radiation source 280 such that there is a volume of liquid-based materials 202 in the build zone 240 sufficient to form the to-be-deposited layer of the additive manufacturing product. The thickness (T) may be controlled by the metering device 212. After passing through the build zone 240, residual liquid-based materials 202 are collected, for example, to be recirculated to the reservoir 200. Relative to dimensions consistent with the dimensions of the build zone 240, the layer 220 of the liquid-based materials 202 is, in the as-supplied condition, continuous and has a substantially consistent thickness (T) as formed by the metering device 212.

The transporting film 222 can be in the form of a continuous belt arranged over rotatable rollers 216, which rotate (R) to move the transporting film 222 in a first direction (M). The transporting film 222 can be any suitable material that is sufficiently transmissive to the curative radiation so that the curative radiation functions to solidify or otherwise form the liquid-based material into the layers of the manufactured object, is sufficiently chemically inert to the liquid-based materials 202 (at least within the time frame which the liquid-based materials 202 are in contact with the transporting film 222) to not influence the composition of the additive manufacturing product, and is sufficiently transparent to allow image capture by the image capture device 300. In some embodiments, the transporting film 222 can be a film of polyethylene terephthalate, more particularly a film of biaxially-oriented polyethylene terephthalate.

Figure 3A:
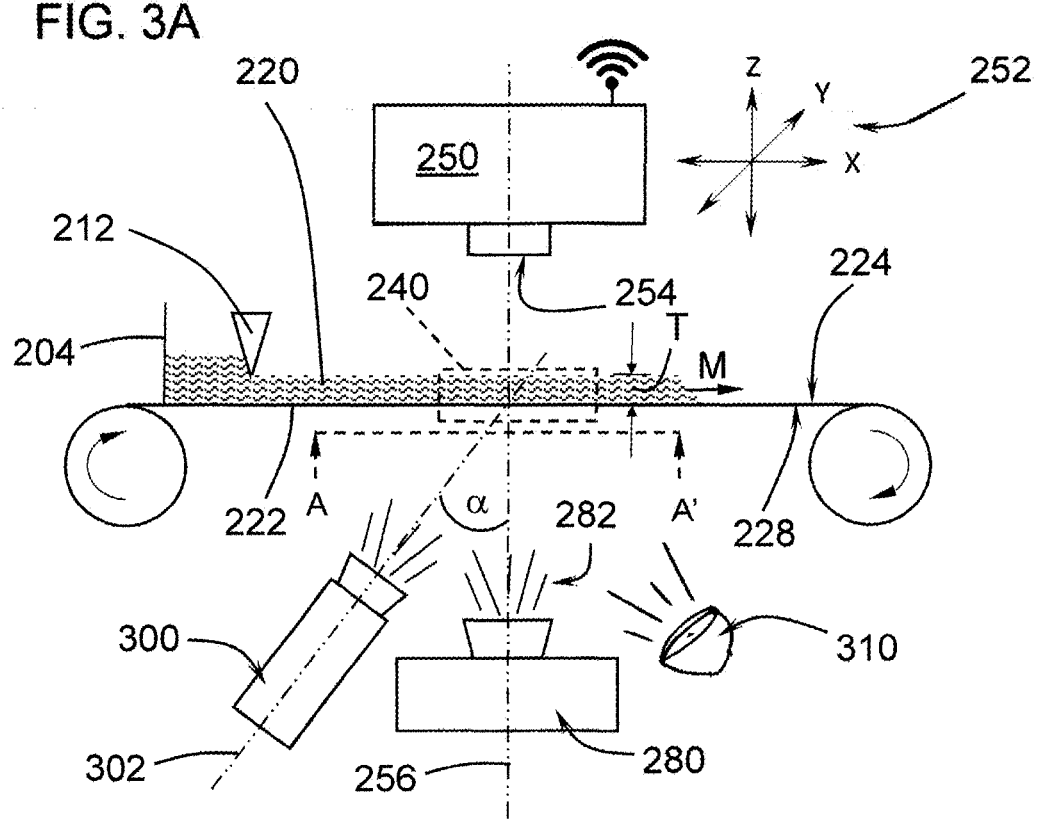
FIG. 3A schematically illustrates supplying a slurry to a transporting film of an additive manufacturing machine and FIG. 3B is a corresponding example image, as seen from below the transporting film, of a layer of the liquid-based slurry material on the transporting film in an as-supplied condition.
Figure 3B:
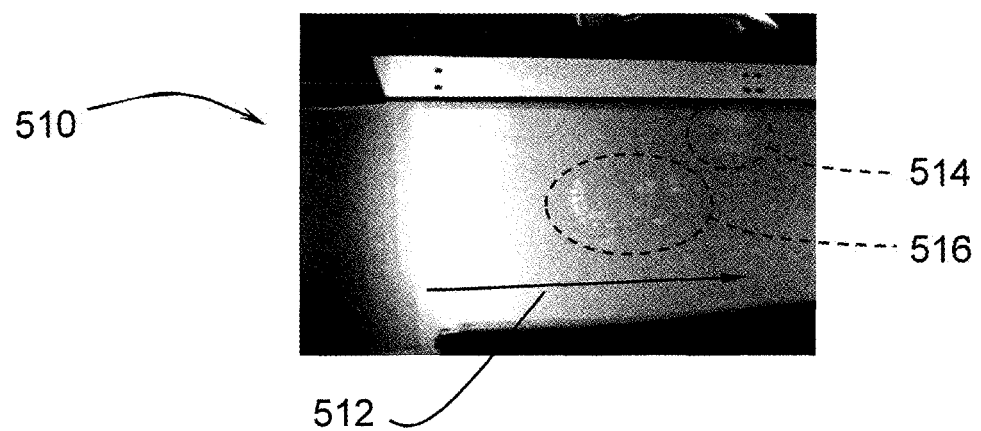

FIG. 3A schematically illustrates an example of a layer 220 of the liquid-based materials 202 on the transporting film 222 in an as-supplied condition and FIG. 3B is a corresponding example image of the layer 220 from FIG. 3A as seen from below the transporting film 222, e.g., in the view indicated as A-A', by the image capture device 300. As seen in the example image in FIG. 3B, the layer 220 is in the as-supplied condition and has a uniform appearance, which indicates a uniform thickness (T) and composition.

Figure 2B:
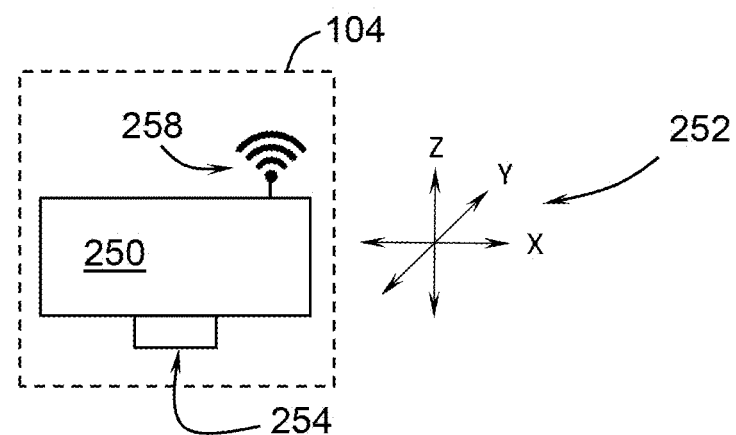

Also for example, FIG. 2B schematically illustrates components 104 on which the additive manufacturing product is built including a build stage 250. The build stage 250 is multi-axial translatable and can be moved in any direction relative to an orthogonally arranged X-axis, Y-axis and Z-axis 252, where the Z-axis is normal to a plane containing the first side 224 of the transporting film 222, the X-axis is parallel to the plane containing the first side 224 of the transporting film 222 and is in a direction parallel to the first direction (M) in which the transporting film 222 moves, and the Y-axis is parallel to the plane containing the first side 224 of the transporting film 222 and is in a direction perpendicular to the first direction (M) in which the transporting film 222 moves. The build stage 250 includes a surface on which the additive manufacturing product will be built, e.g., a deposition surface 254. In some embodiments, the surface 252 is pre-arranged with a base layer of the additive manufacturing product on which subsequent layers will be formed, while in other embodiments, a first layer of the additive manufacturing product is formed directly on the deposition surface 254. In FIG. 2B the deposition surface 254 is a surface of or mounted on the build stage 250; in other figures, such as FIG. 7A, the build stage 250 is depicted with an in-process additive manufacturing product 10, and the deposition surface 20 is a surface on the in-process additive manufacturing product 10 or, for subsequent layers of the in-process additive manufacturing product 10, the deposition surface 20 will be the outer surface of the in-process additive manufacturing product 10, which is regenerated upon each iterative process to be the most distal surface relative to the deposition surface 254 (in the Z-axis). For reference, the length (L) and width (W) of the build zone 240 correspond to the X-axis direction and the Y-axis direction and the thickness (T) of layer 220 of the liquid-based materials 202 on the transporting film 222 corresponds to the Z-axis direction.

Typically, the build stage 250 is positioned above the build zone 240 so that the build stage 250 can be translated in the X-axis and Y-axis to a desired position above the volume of liquid-based materials 202 in the build zone 240 and translated in the Z-axis to immerse the deposition surface 254 on which the additive manufacturing product will be built or the deposition surface 20 (depending on the point at which one is in the iterative deposition process) into the volume of liquid-based materials 202 in the build zone 240. As shown in FIG. 3A, the build stage 250 (and in particular, the deposition surface 254) is aligned with the curative radiation source 280 along an axis 256.

Figure 4A:
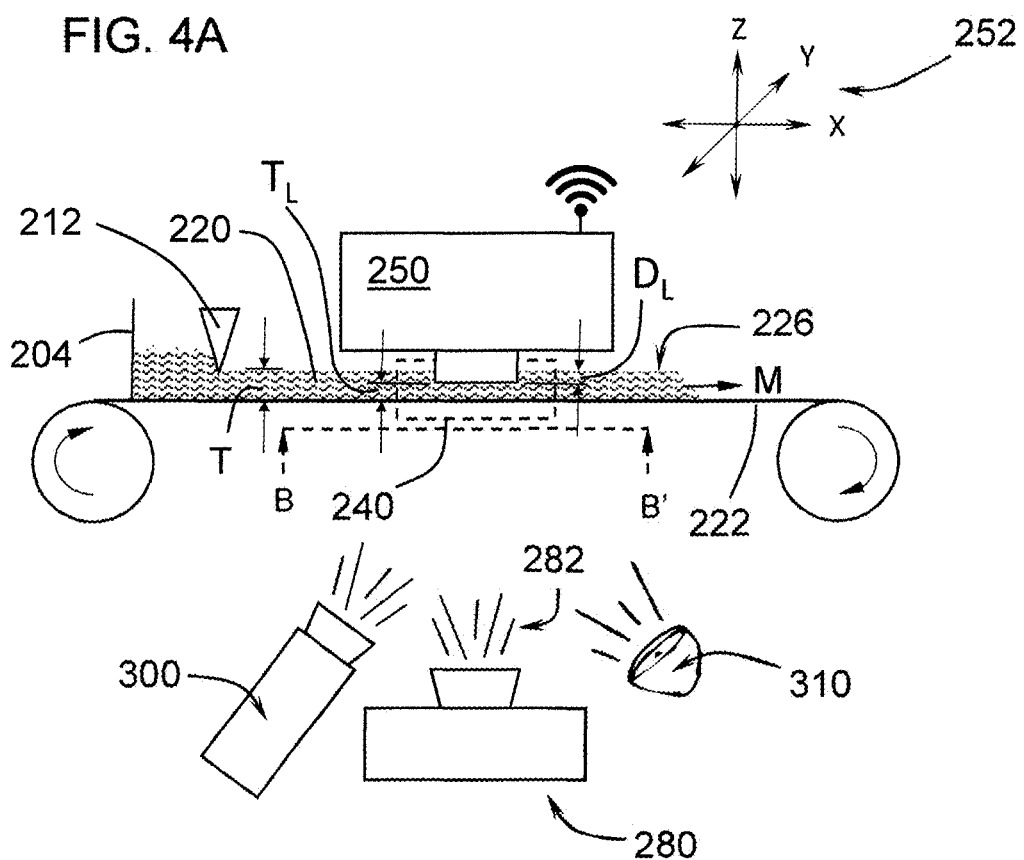
FIG. 4A schematically illustrates translating a build stage of an additive manufacturing machine to an immersion position in which the build stage is immersed into the volume of liquid-based slurry materials and FIG. 4B is a corresponding example image, as seen from below the transporting film, of a layer of the liquid-based slurry material on the transporting film with the build stage at the immersion position.

As an example and as shown in FIG. 4A, in a first translation of the build stage 250 in the Z-axis, the deposition surface 254 (if in an initial deposition layer) or a previously deposited layer of an in-process additive manufacturing product 10 (if in a subsequent or in-process deposition layer) can be immersed into the volume of liquid-based materials 202 in the build zone 240. The volume of liquid-based materials 202 in the build zone 240 is in the as-supplied condition consistent with the thickness (T) of the layer 220 of the liquid-based materials 202 as formed by the metering device 212. Immersing the deposition surface 254 (or in-process additive manufacturing product 10) locates the deposition surface at a layer depth ($D_L$) (relative to a top surface 226 of the layer 220 of the liquid-based materials 202 in an as-supplied condition). The layer depth ($D_L$) is less than the thickness (T) of the layer 220 of the liquid-based materials 202 in the build zone 240 in an as-supplied condition. The difference between the layer depth ($D_L$) and the thickness (T) of the layer 220 corresponds to the maximum thickness ($T_L$) of the to-be-deposited layer of the additive manufacturing product ($T_L = T - D_L$).

Figure 4B:
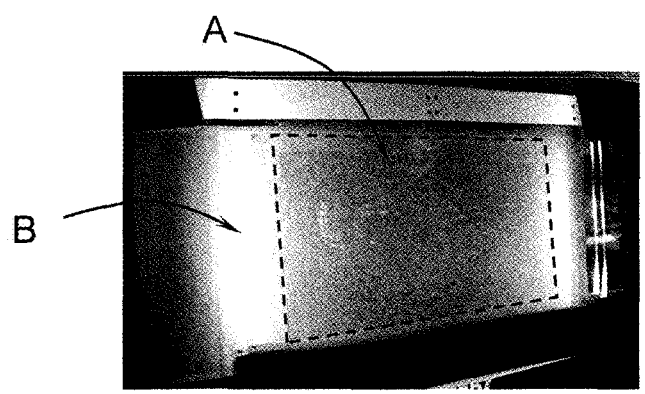

FIG. 4B is a corresponding image of the layer 220 from FIG. 4A as seen from below the transporting film 222, e.g., in the view indicated as B-B', by the image capture device 300. As seen in the example image in FIG. 4B, in the region A of the layer 220 in which the deposition surface 254 (or in-process additive manufacturing product 10) has been immersed, a portion of the volume of the liquid-based materials 202 in the build zone 240 has been displaced. The displacement results in a reduced thickness of the liquid-based materials 202 in areas of the layer 220 that correspond to the geometry and other structural features of the deposition surface. This displacement is observable (as seen from below the transporting film 222) as a change in appearance in the layer 220 relative to the appearance of the layer 220 in the as-supplied condition (as an example compare FIG. 4B with the image of the as-supplied condition in FIG. 3B). In the example image in FIG. 4B, the layer 220 in the region B (outside of region A) is substantially undisturbed and in the as-supplied condition, while the layer 220 in the region A has a change in appearance reflecting the displacement resulting from the immersion of the deposition surface 254.

Also for example, in a second translation of the build stage 250 in the Z-axis and after any deposition process to form an as-deposited layer on the deposition surface (whether on deposition surface 254 or on a subsequent or in-process deposition layer of in-process additive manufacturing product 10), the just deposited, in-process additive manufacturing product 10 is withdrawn from the volume of liquid-based materials 202 in the build zone 240. Typically, the second translation of the build stage 250 in the Z-axis is to a withdrawn position in which the deposition surface 20 of the just-formed layer, e.g., a first layer ($L_n$) or any subsequent layer ($L_{n+1}$), is spaced apart from the plane containing the top surface 226 of the layer 220 and that spans the build zone 240. By being spaced apart, when the transporting film 222 moves in a first direction (M) to transport a new portion of the layer 220 of the liquid-based materials 202 into the build zone 240, the deposition surface 20 of the just-formed layer will not contact a top surface 226 of the layer 220 of the liquid-based materials 202 and will not disturb the as-supplied condition of the layer 220.

Also schematically illustrated in FIG. 2B, the build stage 250 can include or be operatively connected to a wireless transceiver 258. Although shown in connection with build stage 250, any one or more of the components of additive manufacturing machine 100 can include or be operatively connected via wireless transceivers.

FIG. 5A schematically illustrates an example of an in-process additive manufacturing product 10 in the withdrawn position and after having been formed while immersed into the volume of liquid-based materials 202 in the build zone 240 and before the transporting film 222 has moved in the first direction (M) to transport a new portion of the layer 220 of the liquid-based materials 202 into the build zone 240, and FIG. 5B is a corresponding image of the layer 220 from FIG. 5A as seen from below the transporting film 222, e.g., in the view indicated as C-C', by the image capture device 300. FIG. 5C is a magnified and perspective corrected example of the region P1 in the image in FIG. 5B. In the example images, the layer 220 of the liquid-based materials 202 includes one or more voids 290, that are formed by the liquid-based materials 202 having been formed into the as-deposited layer of the in-process additive manufacturing product 10. The voids represent the negative space remaining in the layer 220 of the liquid-based material 202 after a portion of the liquid-based material 202 has been manufactured into the as-deposited layer of the in-process additive manufacturing product 10. Furthermore, the pattern 292 of voids 290 is representative of the deposition surface 20 of the just-formed, as-deposited layer on the deposition surface 20 and the in-process additive manufacturing product 10 has been withdrawn from the volume of liquid-based materials 202, e.g., to a withdrawn position. Such voids 290 are artifacts of the deposition process and correspond in geometry and other structural features to the just-formed as-deposited layer. In addition to pattern 292 in region P1 in the images in FIGS. 5A and 5B, the image contains a second pattern 292' of voids. This second pattern 292' is due to the image being taken after a prior deposition process. An image taken after a first deposition process would not have a second pattern 292'.

The process of the first translation of the build stage 250, formation of the first as-deposited layer, the second translation of the build stage 250, and then moving the transporting film 222 to transport a new portion of the layer 220 of the liquid-based materials 202 into the build zone 240 can be iteratively repeated to form multiple as-deposited layers ($L_1, L_2, \ldots L_{n-1}, L_n$), where n equals the number of as-deposited layers forming the additive manufacturing product.

Figure 2C:
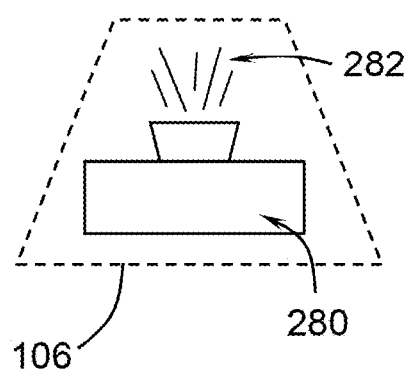

Returning to the sub-units of the additive manufacturing machine 100, FIG. 2C schematically illustrates components 106 to deposit or cure the material forming successive layers of the additive manufacturing product including a curative radiation source 280. As seen in various figures, the curative radiation source 280 is positioned to project curative radiation 282 through the transporting film 222 and into the layer 220 of the liquid-based materials 202, e.g., the slurry for additive manufacturing, that is located in the build zone 240. Any suitable curative radiation source 280 can be used that can cure (or otherwise solidify) the liquid-based materials 202. In exemplary embodiments, the curative radiation source 280 uses electromagnetic radiation at a specified wavelength that reacts with opto-reactive materials in the liquid-based materials 202. Stereolithography (SL), digital light processing (DLP), and electron-beam-based techniques can be used.

Figure 2D:
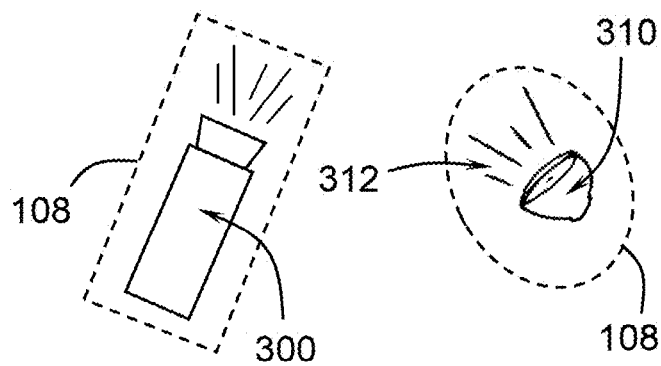

FIG. 2D schematically illustrates components 108 to image the liquid-based materials during deposition of successive layers of the additive manufacturing product, which include an image capture device 300 and an illumination source 310. The image capture device 300 is positioned with a field of view along axis 302 that includes the build zone 240 viewed through the transporting film 222 so as to be capable of capturing images of the liquid-based materials 202 during deposition of successive layers of the additive manufacturing product. Such images can include, for example, images of (i) the layer 220 of liquid-based materials 202 in the as-supplied condition, e.g., see FIGS. 3B and 7B, (ii) the layer 220 of liquid-based materials 202 when the in-process additive manufacturing product 10 is in the withdrawn position and after having been immersed into the volume of liquid-based materials 202 in the build zone 240 and before the transporting film 222 has moved in the first direction (M) to transport a new portion of the layer 220 of the liquid-based materials 202 into the build zone 240, e.g., see FIG. 5B, and (iii) the layer 220 of liquid-based materials 202 when the in-process additive manufacturing product 10 is immersed into the volume of liquid-based materials 202 in the build zone 240 and the deposition surface 20 on the just-deposited, prior layer ($L_{n-1}$) of the in-process additive manufacturing product 10 is located at the layer depth ($D_L$), e.g., see FIG. 8B. The axis 302 of the field of view of the image capture device 300 may be at an angle (α) to the axis 256 associated with the curative radiation emanating from the curative radiation source 280. The value of the angle (α)

is used in image processing and analysis of the various acquired images. Optionally, the image capture device 300 can be in-line with the curative radiation source 280. An example image capture device 300 includes a high resolution camera using CCD, CMOS or hyperspectral imaging technology, and having a resolution of 4 megapixel or more and 16 megapixel or less. Although described herein as images, the images can be either still images or video and include digital formats.

The illumination source 310 is positioned to project visible light 312 toward the layer 220 of liquid-based materials 202 in the build zone 240. Typically, the illumination source 310 is on the same side of the build zone 240 as the image capture device 300 so that it provides sufficient light to the build zone 240 to allow for image capture of sufficient quality to allow subsequent image analysis.

Figure 6:
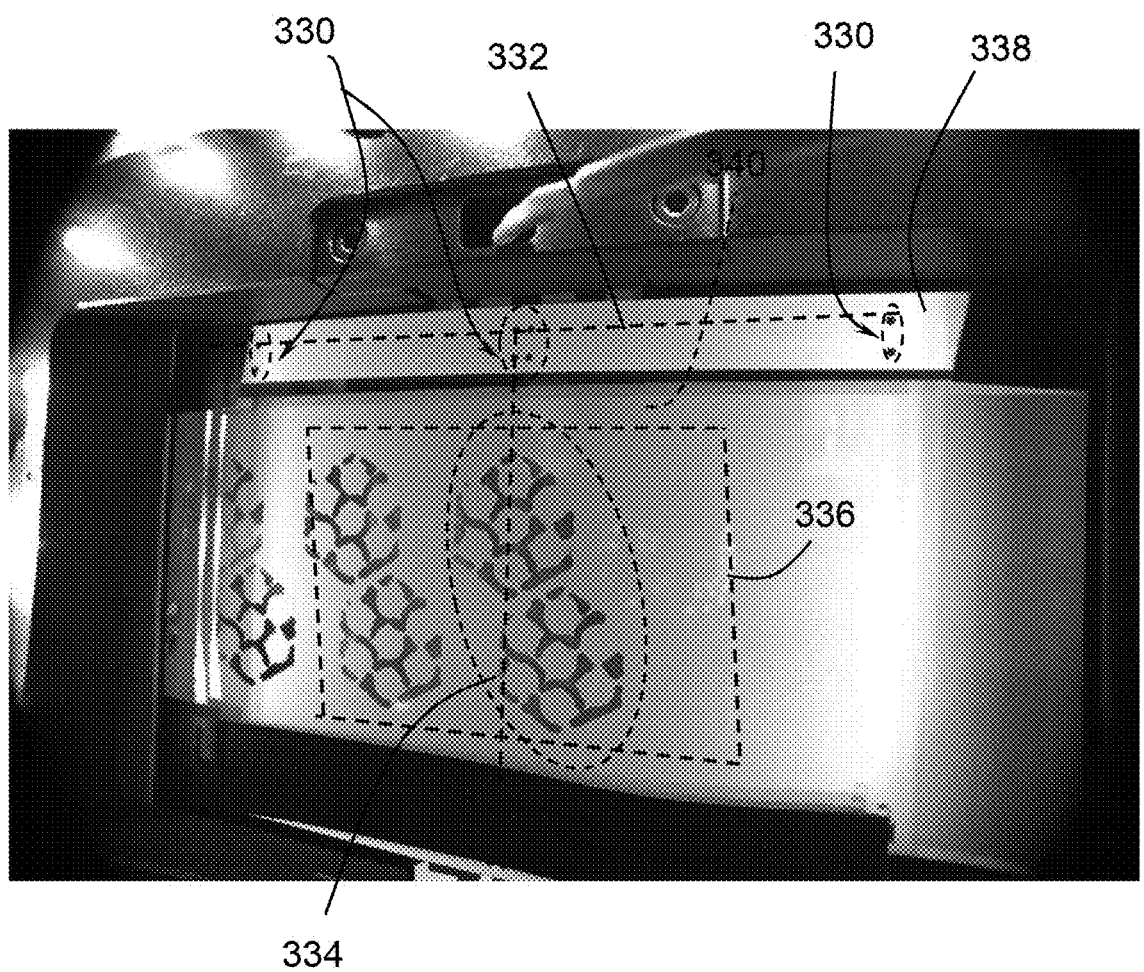
FIG. 6 is an image showing a plurality of registry marks located within the field of view of the image capture device.

In some embodiments, one or more, such as a plurality, of registry marks are located within the field of view of the image capture device 300. FIG. 6 shows an example of registry marks 330 embodied as a pattern of high contrast dots. The registry marks 330 allow alignment and correspondence between two different collected images. As an example, an example collected image can have each pixel assigned a location relative to a coordinate system established by a first axis 332 and a second axis 334 defined relative to the registry marks 330. The registry marks 330 also allow triangulation of the image within build window 336 and is used for processing and analysis of the collected images. The registry marks 330 in FIG. 6 are shown in an example location on stationary targeting strip 338 and relative to the build window 3346 but other locations can be used. In some embodiments, the build window 336 is a window corresponding to the build zone 240.

Figure 2E:
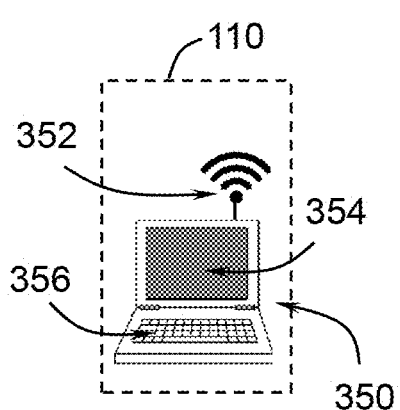

Returning to the sub-units of the additive manufacturing machine 100, FIG. 2E schematically illustrates components 110 to control the additive manufacturing operation based on digital model data and to in-situ monitor the successive layers of the additive manufacturing product for manufacturing defects. In example embodiments, the components 110 include a computer or other control device 350 having one or more processing units (processors or cores), (optionally) one or more network or other communications interfaces, memory including a non-transitory computer readable storage medium, and one or more connections including communication buses and/or wireless transceivers 352 for interconnecting components. The connections optionally include circuitry (sometimes called a chipset) that interconnects and controls communications between system components. The controller system includes a user interface having a display device 354 and (optionally) a user interface 356, such as a keyboard/mouse or other input device. Alternatively, or in addition, the display device 354 can include a touch-sensitive surface, in which case the display device is a touch-sensitive display.

Figure 7A:
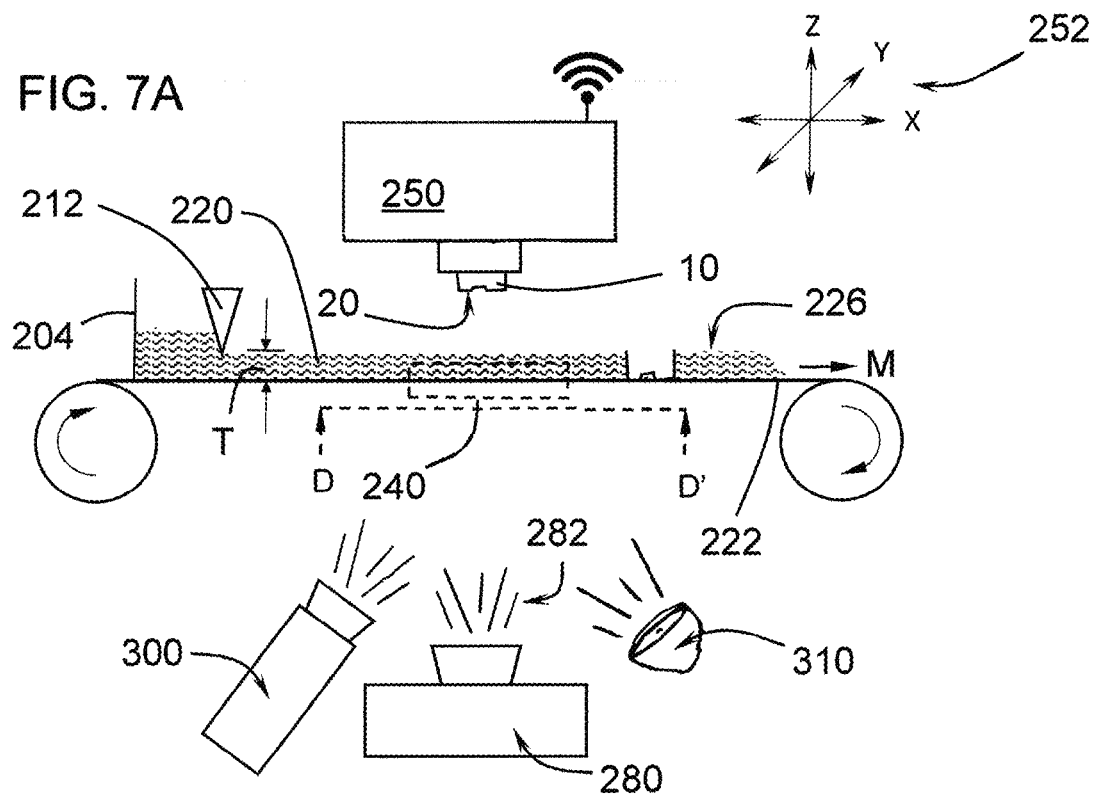
FIG. 7A schematically illustrates supplying a fresh layer of slurry to a transporting film of an additive manufacturing machine.
Figure 7B:
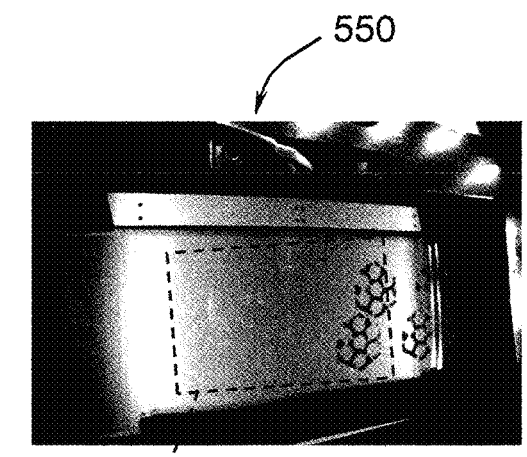
FIG. 7B is a corresponding example image, as seen from below the transporting film, of a layer of the liquid-based slurry material on the transporting film in an as-supplied condition.
Figure 7C:
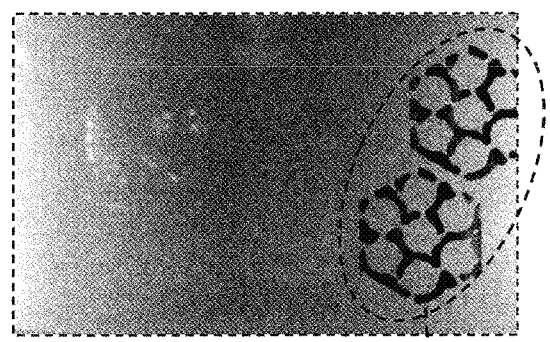
FIG. 7C is a magnified and perspective corrected image corresponding to a portion of the image in FIG. 7B.

FIG. 7A schematically illustrates a subsequent step in the manufacture of an additive manufacturing product. As an example and as shown in FIG. 7A, after obtaining the image of the layer 220 of liquid-based materials 202 when the in-process additive manufacturing product 10 is in the withdrawn position as described and illustrated in association with FIG. 5A-C and FIG. 6, the transporting film 222 can be moved in the first direction (M) to transport a new portion of the layer 220 of the liquid-based materials 202 into the build zone 240. FIG. 7A schematically illustrates an example of a layer 220 of the liquid-based materials 202 on the transporting film 222 in an as-supplied condition and with the build stage 250 in the withdrawn position. Note that this is an in-process representation and that the in-process additive manufacture product 10 is positioned on build stage 250 and is ready for deposition of the next layer on the deposition surface 20. FIG. 7B is a corresponding example image of the layer 220 from FIG. 7A as seen from below the transporting film 222, e.g., in the view indicated as D-D', by the image capture device 300. As seen in the example image in FIG. 7B, the layer 220 is in the as-supplied condition and has a uniform appearance, which indicates a uniform thickness (T) and composition. If depositing the same slurry under the same conditions, then the as-supplied condition for this in-process step should be substantively the same as the as-supplied condition at the beginning of the manufacturing process, e.g., the appearance of the layer 220 in the build zone 240 in the as-supplied condition in the image in FIG. 7B should be substantially the same as the appearance of the layer 220 in the build zone 240 in the as-supplied condition in the image in FIG. 3B (assuming the imaging parameters are consistent). However, the image in FIG. 7B may differ from the image in FIG. 3B by having evidence of the most recent deposition process, such as the pattern 292", which has been transported out of the build zone 240 for the next deposition layer. FIG. 7C is a magnified and perspective corrected example of the region P2 in the image in FIG. 7B and showing the pattern 292" of voids.

In another first translation of the build stage 250 in the Z-axis and as shown in FIG. 8A, the deposition surface 20 of the previously deposited layer of the in-process additive manufacturing product 10 can be immersed into the volume of liquid-based materials 202 in the build zone 240 when in the as-supplied condition consistent with the thickness (T) of the layer 220 of the liquid-based materials 202 as formed by the metering device 212. Immersing the deposition surface 20 locates the deposition surface 20 at a layer depth ($D_L$) (relative to a top surface 226 of the layer 220 of the liquid-based materials 202 in an as-supplied condition). The layer depth ($D_L$) is less than the thickness (T) of the layer 220 of the liquid-based materials 202 in the build zone 240 in an as-supplied condition. The difference between the layer depth ($D_L$) and the thickness (T) of the layer 220 corresponds to the maximum thickness ($T_L$) of the to-be-deposited layer of the additive manufacturing product ($T_L=T-D_L$).

FIG. 8B is a corresponding image of the layer 220 from FIG. 8A as seen from below the transporting film 222, e.g., in the view indicated as E-E', by the image capture device 300. FIG. 8C is a magnified and perspective corrected example of the region P3 in the image in FIG. 8B. As seen in the example images in FIGS. 8B and 8C, in the region C of the layer 220 in which the deposition surface 20 has been immersed, a portion of the volume of the liquid-based materials 202 in the build zone 240 has been displaced. The displacement results in a reduced thickness of the liquid-based materials 202 in areas of the layer 220 that correspond to the geometry and other structural features of the deposition surface 20. This displacement is observable (as seen from below the transporting film 222) as a change in appearance in the layer 220 relative to the appearance of the layer 220 in the as-supplied condition (as an example compare FIGS. 8B and 8C with the images of the as-supplied condition in FIGS. 7B and 7C). In the example images in FIGS. 8B and 8C, the layer 220 in the region D (outside of region C) is substantially undisturbed and in the as-supplied condition.

The displacement in region C forms a pattern 370 that is representative of the deposition surface 20. Thus, the image in FIGS. 8B and 8C provides information on the surface of the deposition surface 20 that has just been formed in the prior deposition process and before any subsequent deposition process (for example and more generally, information on a first layer ($L_n$) prior to deposition of a second layer ($L_{n+1}$)). For example, because of the displacive influence of immersing the additive manufacturing product 10 into the slurry volume in the build zone 240 to the immersed position, the portion of the slurry volume between the surface of the first layer ($L_n$) and the transporting film 222 is thinner than the thickness (T) of the layer 220 in the as-supplied condition. Additionally, this reduced thickness is sufficiently thin that surface features of the surface of the first layer ($L_n$) can be observed. Observable surface features include the geometric shape of the printed part. The surface features can be observed either directly or indirectly. In direct observation, the slurry is sufficiently transparent that the surface features of the surface of the first layer ($L_n$) are observable through thickness $T_L$ of the layer 220. In indirect observation, surface features of the surface of the first layer ($L_n$) impart characteristics to the slurry that correspond to the surface features.

Figure 9:
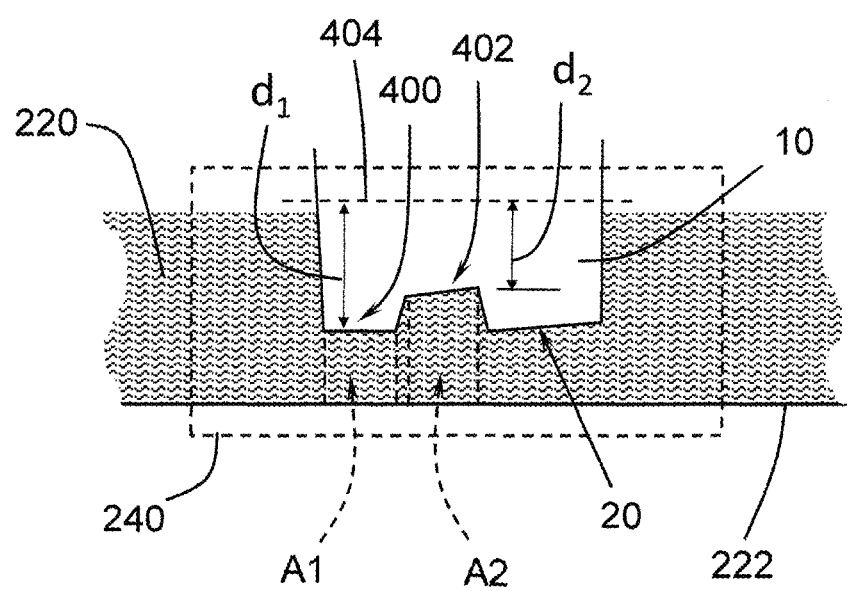
FIG. 9 is a schematic cross-sectional side view showing an additive manufacturing product immersed into the slurry volume to the immersed position.

For purposes of illustration and with reference to FIG. 9, which is a schematic cross-sectional side-view showing the additive manufacturing product 10 immersed into the slurry volume in the build zone 240 to the immersed position, example surface features are shown including a mesa 400 and a channel 402, both of which are at a distance ($d_1$, $d_2$ respectively) from a reference surface indicated by dashed line 404 (which can be an imaginary reference surface or, for example, the surface of the last deposited layer of the additive manufacturing product 10). Because of the different distances, surfaces of the mesa 400 and of the channel 402 are at different distances relative to the transporting film 222. Thus, the thickness of the layer 220 slurry between the surfaces of the mesa 400 and of the channel 402 are different. Because of the differences in the surfaces (such as distance ($d_1$, $d_2$)), the different areas A1 and A2 of the slurry have different visual appearances when viewed through the transporting film 222. These different visual appearances correspond to the underlying surfaces and provide a secondary indicia of the surface features. For example, a surface feature such as a channel 402 (or a hole in the in-process additive manufacturing product 10) will result in a thicker slurry between the surface feature and the transporting film 222, which will be observable as a visibly darker or more opaque portion of the slurry. In contrast, a surface feature such as a mesa 400 will result in a thinner slurry between the surface feature and the transporting film 222, which will be observable as a visibly lighter or more transparent portion of the slurry. In some embodiments, the thinner slurry between the surface feature and the transporting film is sufficiently transparent that that the actual surface features are observable.

Figure 10A:
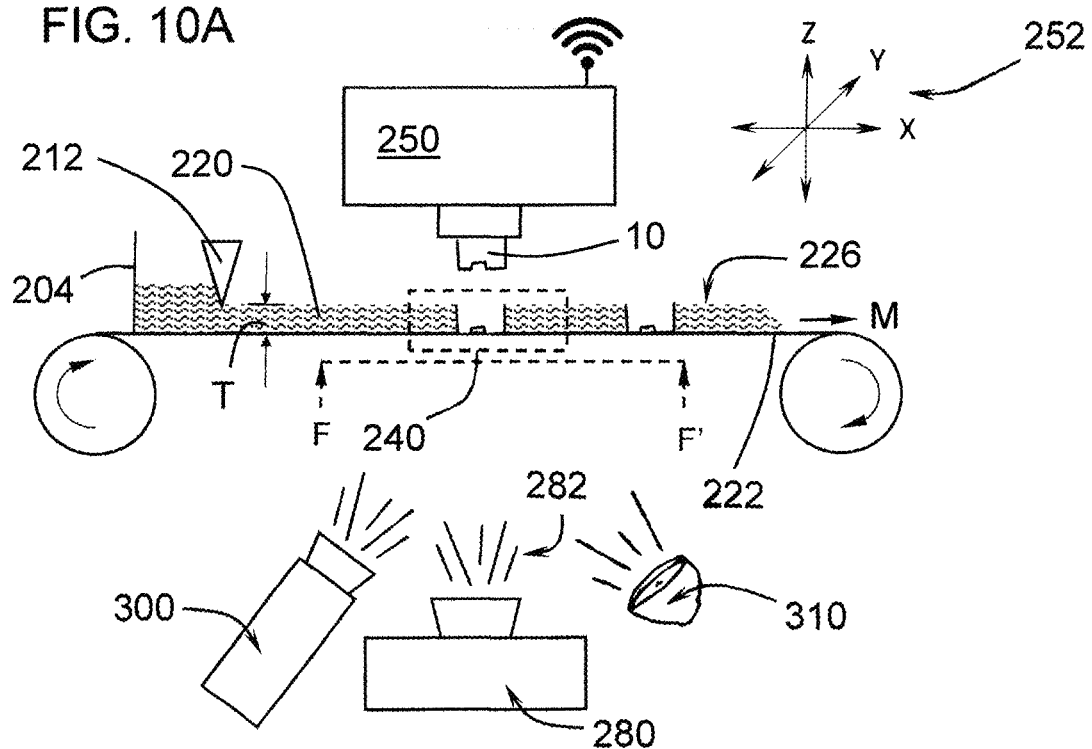
FIG. 10A schematically illustrates a subsequent step in the manufacture of an additive manufacturing product and FIG. 10B is a corresponding example image, as seen from below the transporting film, of a layer of the liquid-based slurry material on the transporting film showing the pattern of voids resulting from the most recent additive manufacturing deposition process.
Figure 10B:
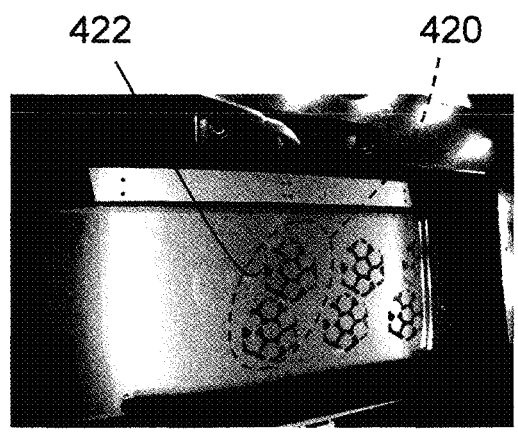
Figure 11A:
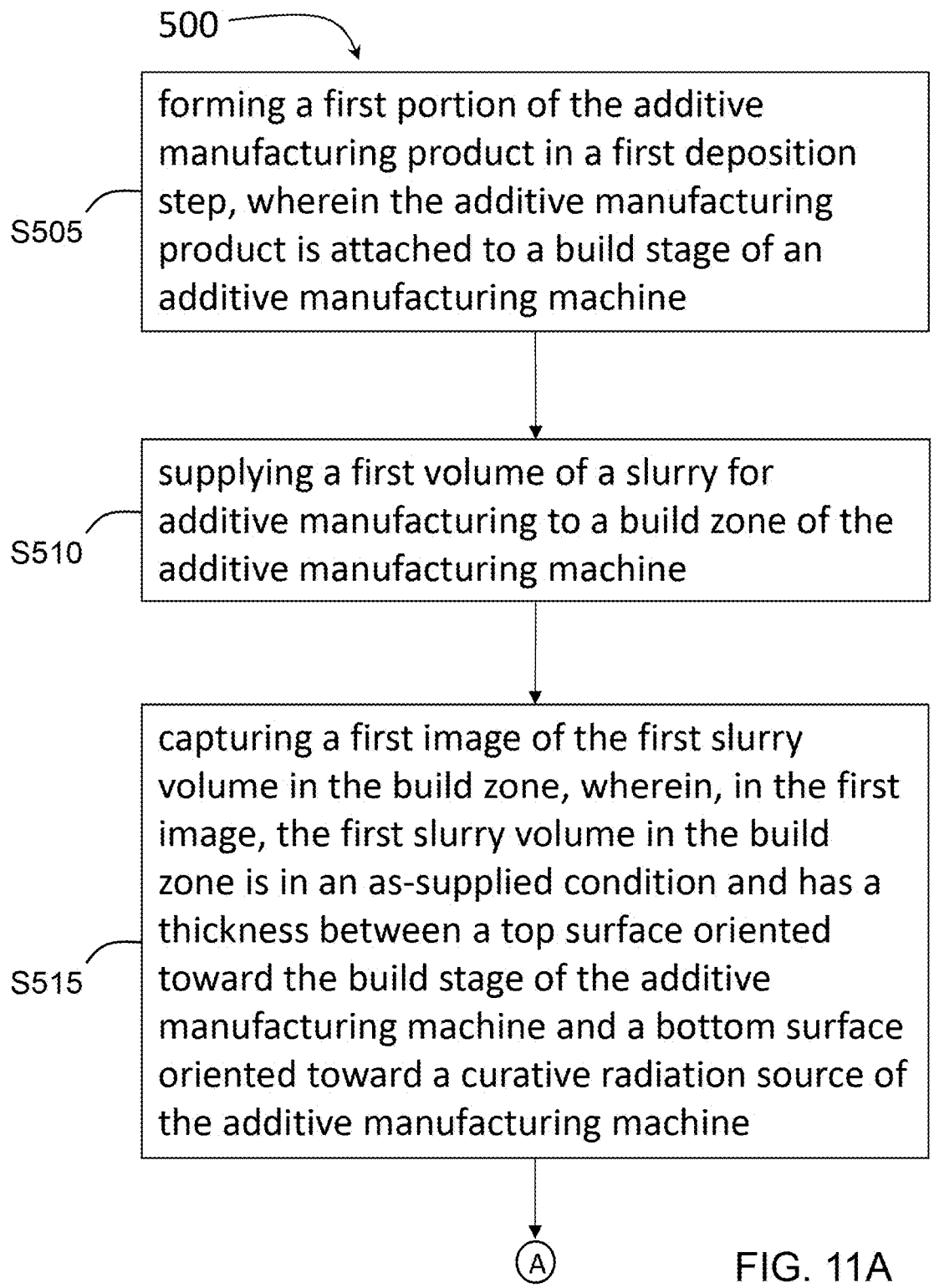
FIGS. 11A to 11F are a flow diagram setting forth steps in an embodiment of a method of manufacturing an additive manufacturing product and to in-situ monitor production of the additive manufacturing product.
Figure 11B:
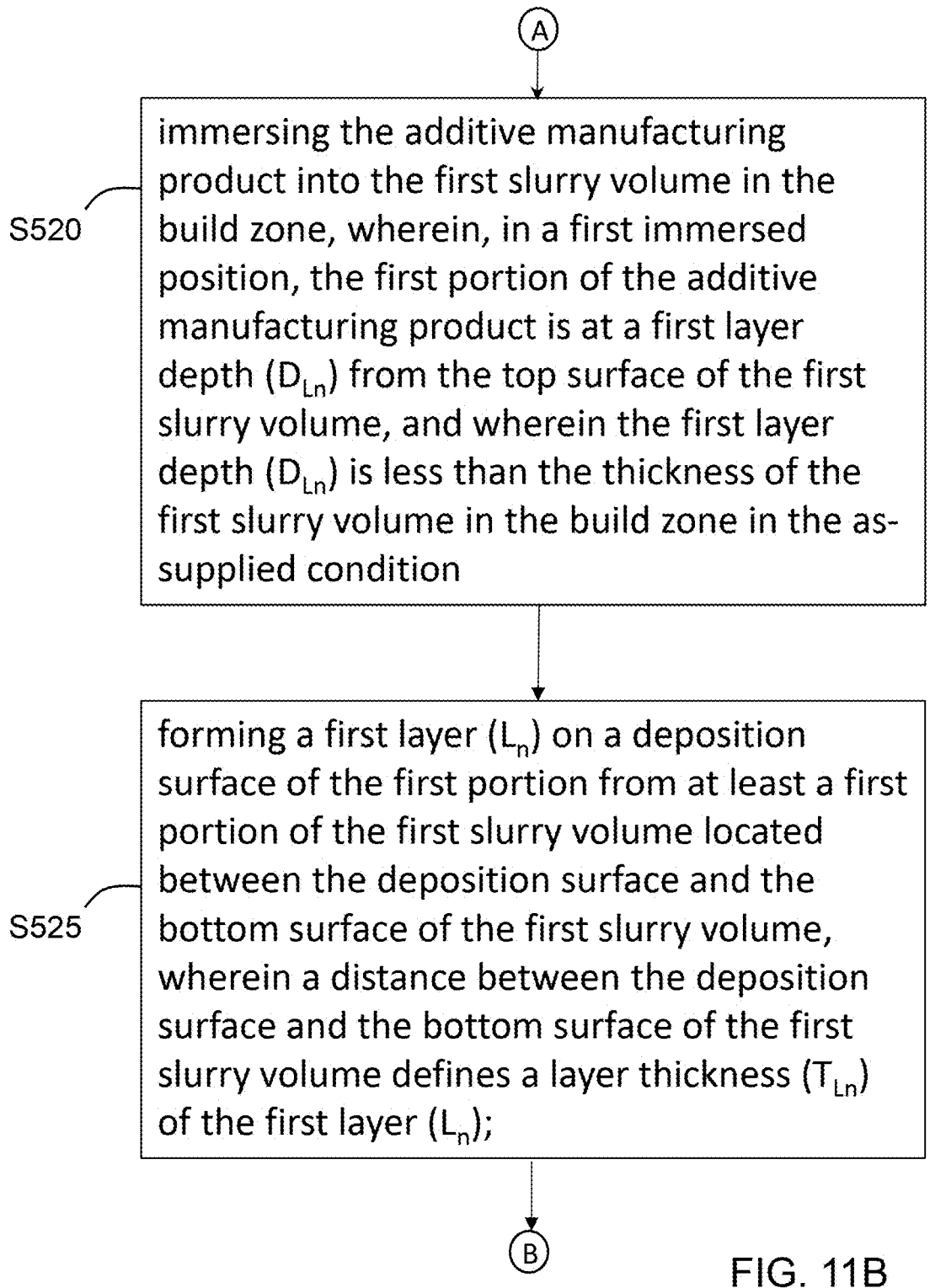
Figure 11C:
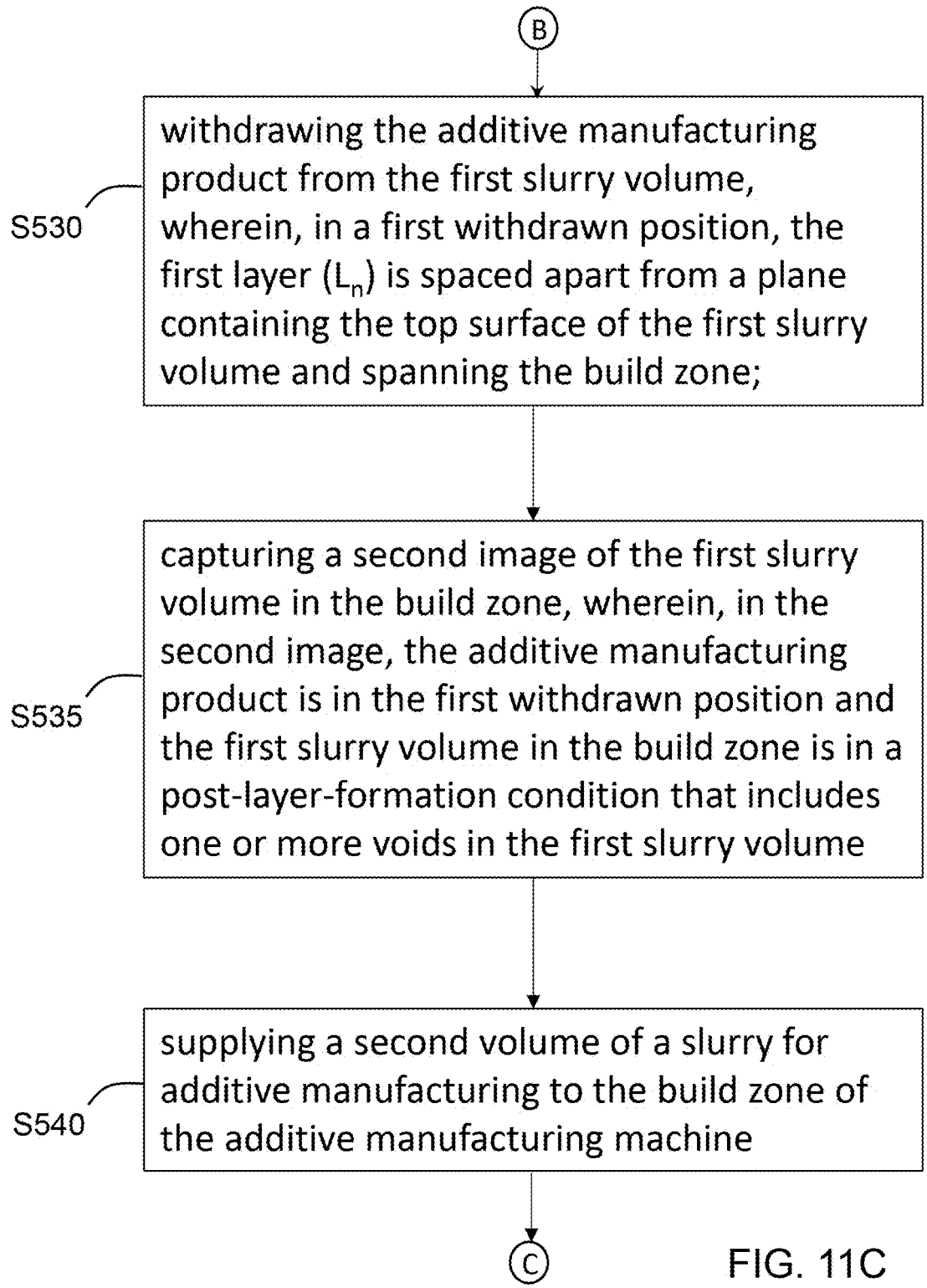
Figure 11D:
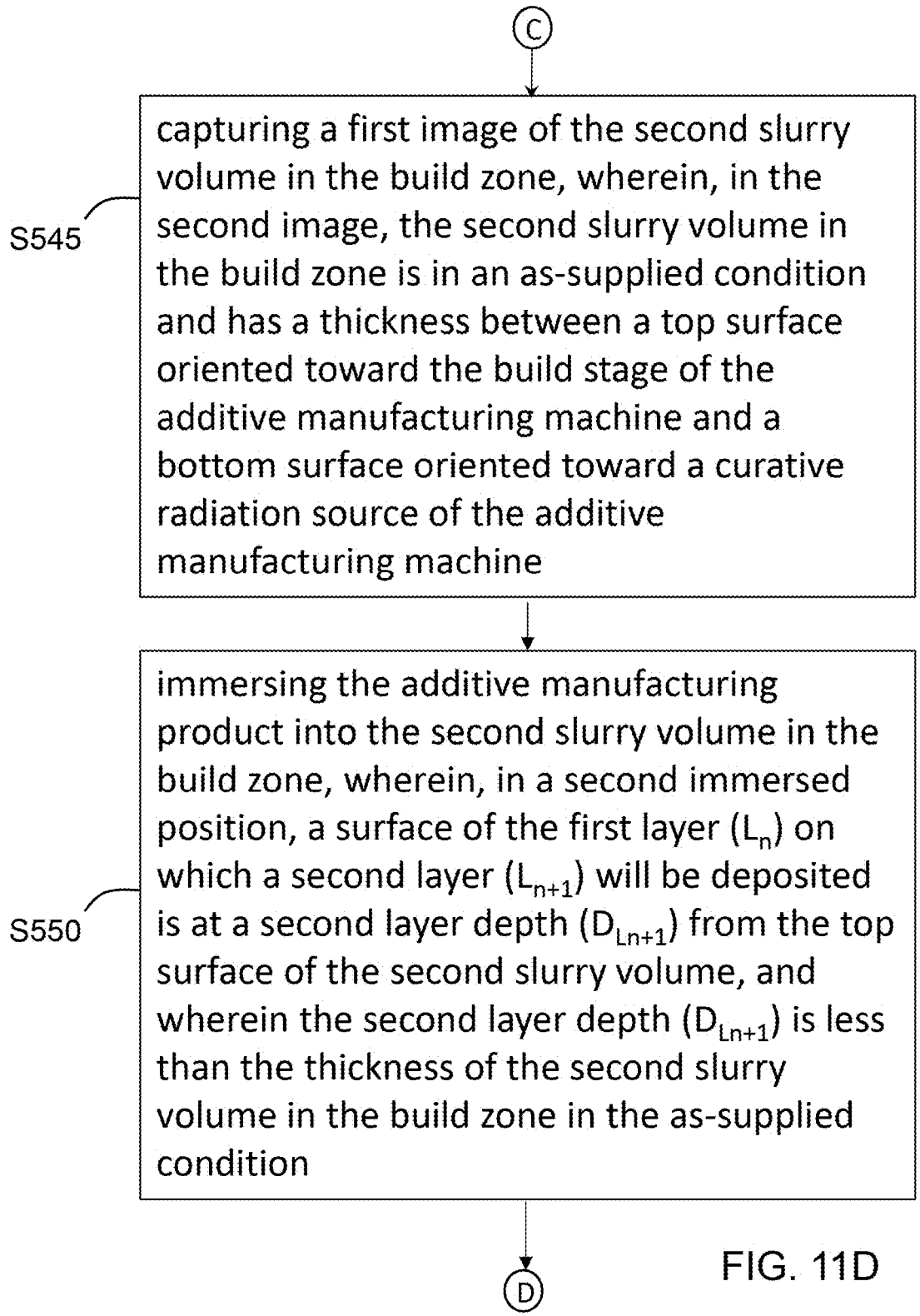
Figure 11E:
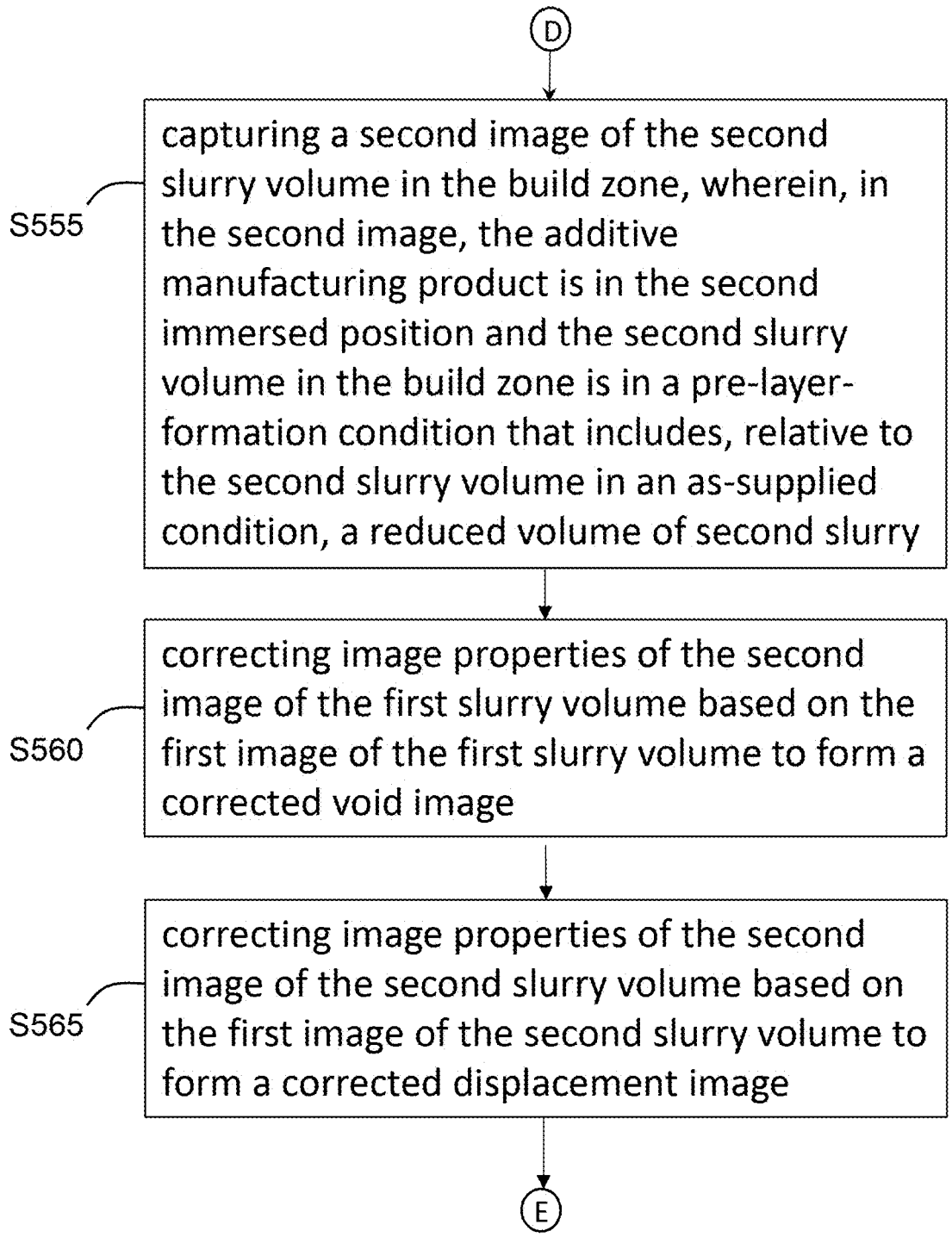
Figure 11F:
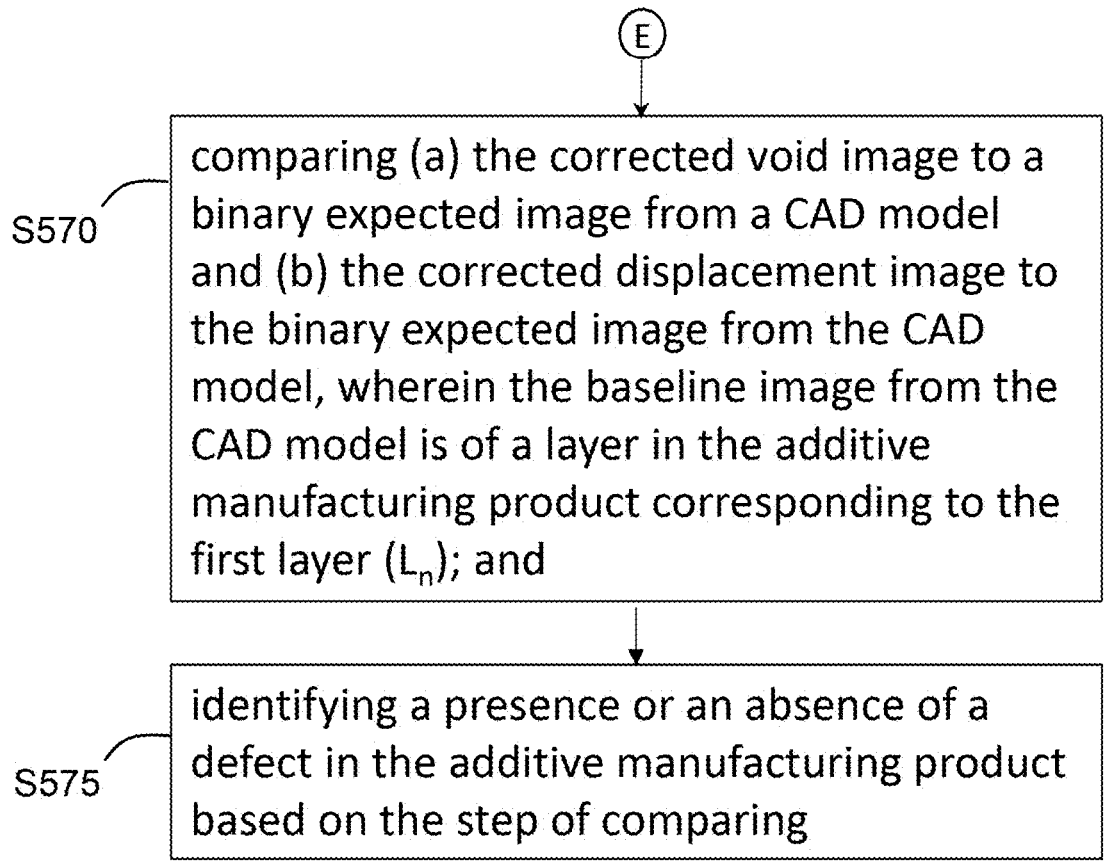

FIG. 10A schematically illustrates a subsequent step in the manufacture of an additive manufacturing product. As an example and as shown in FIG. 10A, after obtaining the image of the layer 220 of liquid-based materials 202 when the in-process additive manufacturing product 10 is in the immersed position as described and illustrated in association with FIGS. 9A-C and after having formed any subsequent layer ($L_{n+1}$) on the deposition surface 20, the just deposited, in-process additive manufacturing product 10 is withdrawn from the volume of liquid-based materials 202 in the build zone 240. As previously described in relation to FIGS. 5A to 5C, typically this second translation of the build stage 250 is in the Z-axis and is to the withdrawn position. FIG. 10B is a corresponding image of the layer 220 from FIG. 10A as seen from below the transporting film 222, e.g., in the view indicated as F-F', by the image capture device 300 and showing the pattern 420 of voids 422 resulting from the most recent additive manufacturing deposition process.

The present disclosure also relates to methods to in-situ monitor production of an additive manufacturing product during the additive manufacturing process. FIGS. 11A to 11F outline an embodiment of a method 500 to in-situ monitor production of an additive manufacturing process. The various processes outlined in the steps of the flowchart in FIGS. 11A to 11F can be read and interpreted in connection with the schematics and images in FIGS. 3A-B to 10A-B.

The additive manufacturing process begins by forming or otherwise providing a surface, e.g., a base surface, on which a first layer ($L_n$) of the additive manufacturing product 10 will be formed. If the first layer ($L_n$) of the method 500 is an initial layer of the additive manufacturing product 10, the base surface can be the deposition surface 254 of the build stage 250; if the first layer ($L_n$) of the method 500 is a subsequent layer of the additive manufacturing product 10, the base surface can be the deposition surface 20 of the just-deposited, prior layer ($L_{n-1}$) of the in-process additive manufacturing product 10. In the illustrated method 500, a first portion of the additive manufacturing product 10 is formed in a first deposition step S505, wherein the additive manufacturing product is attached to a build stage 250 of an additive manufacturing machine. Forming the first portion can proceed by a process that forms a first layer ($L_n$) of the additive manufacturing product 10 on the build stage 250 or by a process of forming a subsequent layer ($L_{n+1}$) of the additive manufacturing product 10 onto the deposition surface 20 of the just-deposited prior layer ($L_n$).

Once a first portion of the additive manufacturing product has been formed and the additive manufacturing product is attached to the build stage 250, the method 500 continues by supplying S510 a first volume of a slurry for additive manufacturing to a build zone of the additive manufacturing machine. FIG. 3A schematically illustrates an additive manufacturing machine during a process of supplying a first volume of a slurry for additive manufacturing to a build zone 240 of the additive manufacturing machine. A volume of liquid-based materials 202, e.g., slurries, present in an interim reservoir 204 are formed into a thin, e.g., less than 100 micron, layer 220 of the liquid-based materials 202 on a transporting film 222 by a doctor blade 212, which acts as a metering device 212. An example thickness of the layer 220 is 30-100 micron, such as 40-80 microns. The transporting film 222 is advanced in a direction (M) and causes the layer 220 of liquid-based materials 202 to also move into the build zone 240 below the build stage 250, which is the surface on which the additive manufacturing product 10 is formed.

After supplying the first volume of a slurry and the layer 220 of the liquid-based materials 202 on a transporting film 222 is in the as-supplied condition (as described herein), the method 500 continues by capturing S515 an image of the first slurry volume in the build zone 240. FIGS. 3A-B (for an initial layer) schematically illustrate an additive manufacturing machine during a process of capturing an image of the first slurry volume in the build zone 240 and an example image 510 (sometimes referred to herein as a first image of the first slurry volume in the build zone). The first image 510 is captured by the image capturing components 108, such as image capture device 300 in conjunction with illumination source 310 (as necessary to provide adequate image quality), and is of a first slurry volume in the build zone 240 in an as-supplied condition. The first image 510 of the first slurry volume is taken through the transporting film 222 and shows the bottom surface 228 of the layer 220 of the liquid-based materials 202 that is oriented toward the curative radiation source 280. In the first image 510, the slurry volume is substantially undisturbed and uniform. The first image 510 provides baseline information on layer 220 of the liquid-based materials 202 in the as-supplied condition to be used in subsequent calibration and comparison processes. Other factors accounted for by taking sequential, real-time baseline information includes changes in environmental conditions, such as from lighting. For example, the first image 510 in FIG. 3B shows lighting effects including a lighting gradient (from light to dark as one goes from left to right in the image as shown by arrow 512) and reflections 514 from, for example, the illumination source 310, or from other equipment 516. It is also possible to detect non-uniformity in the slurry, such as from streaks resulting from inadequate layer formation or impurities in the liquid-based materials 202 forming the layer 220 of slurry. FIGS. 7A-C illustrate this process for a subsequent layer.

The method 500 continues and the additive manufacturing product 10 is then immersed S520 into the first slurry volume in the build zone 240 to a first immersed position and a first layer ($L_n$) is formed on a deposition surface. FIGS. 4A-B schematically illustrates this process (for an initial layer). In the first immersed position, the first portion of the additive manufacturing product 20 (or a first portion of the build stage 250 if the initial deposition of the additive manufacturing product 10) is at a first layer depth ($D_{Ln}$) from the top surface 226 of the layer 220, which also forms a first slurry volume in the build zone 240. The first layer depth ($D_{Ln}$) is less than the thickness (T) of the first slurry volume in the build zone 240 in the as-supplied condition and the difference between the first layer depth ($D_{Ln}$) and the thickness (T) of the layer 220 corresponds to the maximum thickness ($T_L$) of the to-be-deposited layer of the additive manufacturing product ($T_L=T-D_{Ln}$). The first layer ($L_n$) is formed S525 on a deposition surface 20 of the first portion from at least a first portion of the first slurry volume located between the deposition surface 20 and the bottom surface of the first slurry volume. The first layer ($L_n$) is formed on the deposition surface 20 by exposing the first slurry volume to curative radiation 282 from the curative radiation source 280 based on parameters in the 3D model or other electronic data source used to operate the additive manufacturing machine to the make the additive manufacturing product. Exposing connects the newly formed material to the deposition surface to form a continuous body. Additionally, the distance between the deposition surface 20 and the bottom surface of the first slurry volume defines a layer thickness ($T_{Ln}$) of the first layer ($L_n$). FIGS. 8A-C illustrate this process for a subsequent layer.

After forming the first layer ($L_n$), the method 500 continues by withdrawing S530 the additive manufacturing product 10 from the first slurry volume to a withdrawn position. FIG. 5A schematically illustrates the additive manufacturing product 10 in the withdrawn position. In the withdrawn position, the just-formed first layer ($L_n$) is spaced apart from a plane (P) containing the top surface 226 of the first slurry volume and spanning the build zone 240 (for example and as shown in FIG. 5A, spaced apart from the top surface 226 of the layer 220 by a distance SA). Withdrawing places the just-formed first layer ($L_n$) in a position where no portion of the just-formed first layer ($L_n$) will be in contact with the layer 220 of liquid-based materials 202 during subsequent movement of the transporting film 222 in direction (M) to move the just-used portion of the layer 220 of liquid-based materials 202 out of the build zone 240 and to move a new portion of the layer 220 of liquid-based materials 202 (such portion being in the as-supplied condition) into the build zone 240.

Because the volume of material between the deposition surface 20 and the bottom surface 228 of the first slurry volume has formed the first layer ($L_n$), withdrawing the additive manufacturing product 10 leaves a series of openings or voids in the layer 220 of liquid-based materials 202 corresponding to the withdrawn material formed into the first layer ($L_n$). The method 500 captures S535 an image of the slurry in this condition (sometimes referred to herein as a second image of the first slurry volume in the build zone). Example image 530 is of the first slurry volume in the build zone after the first layer ($L_n$) has been formed, e.g. in the post-layer-formation condition, and the additive manufacturing product 10 has been repositioned to the withdrawn position. The image 530 is captured by the image capturing components 108, such as image capture device 300 in conjunction with illumination source 310 (as necessary to provide adequate image quality), and is of a first slurry volume in the build zone 240 in post-deposition condition. The image 530 of the first slurry volume is taken through the transporting film 222 and shows the bottom surface 228 of the layer 220 of the liquid-based materials 202 that is oriented toward the curative radiation source 280.

Information on the just-formed first layer ($L_n$) can be inferred from information in the image 530. For example, in the post-layer-formation condition, the slurry volume in the build zone includes one or more voids 290. Because of the correspondence to the withdrawn material formed into the first layer ($L_n$), these voids 290 can be analyzed and correlated to the build quality of the just-formed first layer ($L_n$) of the in-process additive manufacturing product 10. Additionally, if there is residual slurry within the perimeter of the void 290, such residual slurry may be indicative of manufacturing defects in the just-formed first layer ($L_n$), such as corresponding to an area in the just-formed first layer ($L_n$) that is missing material deposited from the slurry and, therefore, has formed a pore in the body of the just-formed first layer ($L_n$). The presence of pores in the just-formed first layer ($L_n$) can, over successive deposition processes, lead to porosity in the as-manufactured additive manufacturing product 10.

After capturing image 530, e.g., after capturing the second image of the first slurry volume in the build zone 240, the method 500 continues by supplying S540 a volume of a slurry (sometimes referred to herein as a second volume of slurry) for additive manufacturing to the build zone 240 of the additive manufacturing machine. FIG. 7A schematically illustrates an additive manufacturing machine during a process of supplying a second volume of a slurry for additive manufacturing to a build zone 240 of the additive manufacturing machine. A volume of liquid-based materials 202, e.g., slurries, present in an interim reservoir 204 are formed into a thin, e.g., less than 100 micron, layer 220 of the liquid-based materials 202 on a transporting film 222 by a doctor blade 212, which acts as a metering device 212. An example thickness of the layer 220 is 30-100 micron, alternatively 40-80 microns. The transporting film 222 is advanced in a direction (M) and causes a portion of layer 220 of liquid-based materials 202 that is in the as-supplied condition to move into the build zone 240 below the build stage 250. At the same time, advancement of the transporting film 222 in a direction (M) causes the portion of the layer 220 used in the last deposition process (e.g., the portion with voids 290) to move out of the build zone 240. Eventually, after multiple cycles during which the transporting film 222 is advanced in the direction (M), layer 220 of the liquid-based materials 202 is recovered from the transporting film 222 and collected, for example, for recirculation to the reservoir 200.

After supplying the second volume of slurry for additive manufacturing to the build zone 240, the method 500 captures S545 an image of the second volume of slurry in the as-supplied condition (sometimes referred to herein as a first image of the second slurry volume in the build zone). Example image 550 (see FIG. 7B) is of the second slurry volume in the build zone in the as-supplied condition. Note that the additive manufacturing product 10 has not yet been in contact with the second slurry volume, and preferably has not been repositioned from the withdrawn position. The image 550 is captured by the image capturing components 108, such as image capture device 300 in conjunction with illumination source 310 (as necessary to provide adequate image quality). The image 550 of the second slurry volume is taken through the transporting film 222 and shows the bottom surface 228 of the layer 220 of the liquid-based materials 202 that is oriented toward the curative radiation source 280. In the image 550, one observes an uniform slurry surface with minimal or no visible variation in material appearance on the "fresh" side of the film. The image 550 provides baseline information on layer 220 of the liquid-based materials 202 in the as-supplied condition to be used in subsequent calibration and comparison processes.

The method 500 continues and the additive manufacturing product 10 is immersed S550 into the second slurry volume in the build zone 240 to a second immersed position. FIG. 8A schematically illustrates this process. In the second immersed position, the surface of the first layer ($L_n$) on which a second layer ($L_{n+1}$) will be deposited is at a second layer depth ($D_{Ln+1}$) from the top surface 226 of the layer 220, which also forms a second slurry volume in the build zone 240. The second layer depth ($D_{Ln+1}$) is less than the thickness (T) of the second slurry volume in the build zone 240 in the as-supplied condition and the difference between the second layer depth ($D_{Ln+1}$) and the thickness (T) of the layer 220 corresponds to the maximum thickness ($T_{L2}$) of the to-be-deposited layer of the additive manufacturing product ($T_{L2}=T\ D_{Ln-1}$).

In some examples, the second immersed position is the same as the first immersed position and the second layer depth ($D_{Ln+1}$) is the same as the first layer depth ($D_{Ln}$) ($D_{Ln+1}=D_{Ln}=D_L$). This is typically the case when iteratively depositing layers of a first contiguous feature of the additive manufacturing product. However, in other instances, such as when transitioning from a first contiguous feature of the additive manufacturing product to a second contiguous feature, the second layer depth ($D_{Ln+1}$) can vary from the first layer depth ($D_{Ln}$).

After immersing the additive manufacturing product 10 into the second slurry volume in the build zone 240 to the second immersed position and prior to forming the second layer ($L_{n+1}$) on the deposition surface, the method 500 continues by capturing S555 an image of the second volume of slurry (sometimes referred to herein as a second image of the second slurry volume in the build zone). Example image 570 (see FIG. 8B) is of the second slurry volume in the build zone with the additive manufacturing product 10 immersed into the second slurry volume in the build zone 240 to the second immersed position and prior to forming the second layer ($L_{n+1}$) on the deposition surface. The image 570 is captured by the image capturing components 108, such as image capture device 300 in conjunction with illumination source 310 (as necessary to provide adequate image quality). The image 570 of the second slurry volume is taken through the transporting film 222 and shows the bottom surface 228 of the layer 220 of the liquid-based materials 202 that is oriented toward the curative radiation source 280.

After forming the second layer ($L_{n+1}$), the method 500 continues by withdrawing the additive manufacturing product 10 from the second slurry volume to a withdrawn position (see FIG. 10A).

Concurrently with or subsequently to capturing the desired images of the layers formed in the additive manufacturing process, the method 500 continues by correcting and then analyzing the captured images. In this process, the correction removes variations in lighting and surface texture from the second (displacement) image and third (void) image by removing details present in the first (baseline) image. For example, image properties of the second image of the first slurry volume (e.g., image 530) are corrected S560 based on the first image of the first slurry volume (e.g., image 510) to form a corrected void image. Also, image properties of the second image of the second slurry volume (e.g., image 570) are corrected S565 based on the first image of the second slurry volume (e.g., image 550) to form a corrected displacement image. As part of the correction of each image (e.g., images 510, 530, 550, 570), the as-obtained image can be corrected for triangulation and offset from the axis normal to the bottom surface 228 of the layer 220 (for example using the registry marks 330 as shown and described in connection with FIG. 6 and based on angle α), which is also known as "perspective correction." As applicable, other corrections can be applied to individual images prior to correcting to form the corrected void image and/or corrected displacement image, such as optical lens correction, which accounts for radial distortion induced by the curvature of the lens (such optical lens correction can utilize software, such as using the undistort function in the open-source software OpenCV (available from Open Source Computer Vision Library).

Figure 12A:
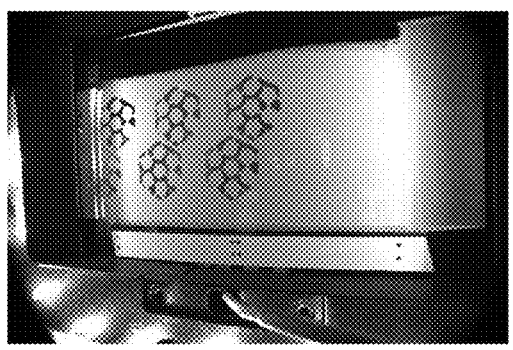
FIGS. 12A-12C are example images from different stages of the process of forming a corrected void image.
Figure 12B:
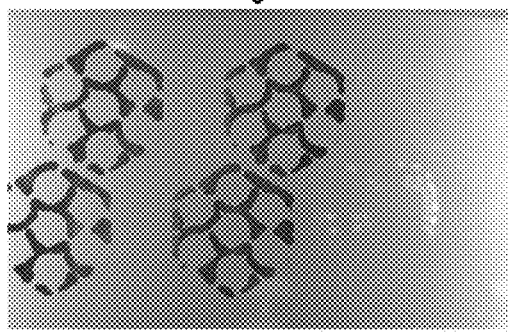
Figure 12C:
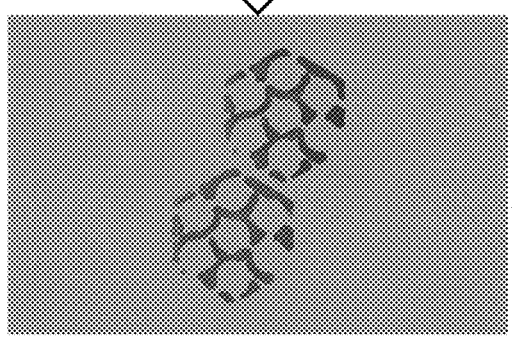

Forming the corrected void image proceeds by the following. An example of this process is illustrated by the images in FIGS. 12A-C. The as-captured image 700 is corrected for perspective and offset to form a first interim corrected image 710. The first interim corrected image 710 is then corrected for environmental conditions such as (i) reflections on the surfaces in the field of view, such as any glass surfaces and the surface of the transporting film 222, (ii) variations in coloration of the slurry 202, and (iii) any lighting gradients. Such correction can occur by normalizing based on the first image of the first slurry volume 530 (e.g., the "start of layer" image). It should be noted that the first image of the first slurry volume may also be corrected for perspective and offset, and the corrected first image of the first slurry volume may then be used as the baseline for correcting the void image for environmental conditions. The result of the corrections is a corrected void image 720.

Figure 13A:
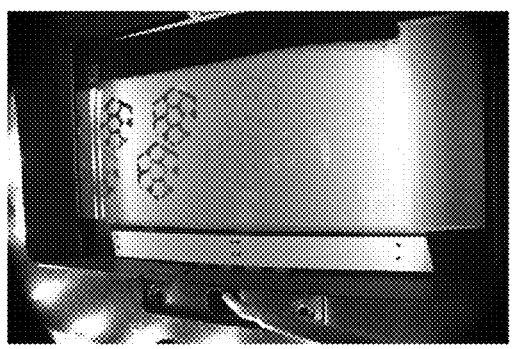
FIGS. 13A-13C are example images from different stages of the process of forming a corrected displacement image.
Figure 13B:
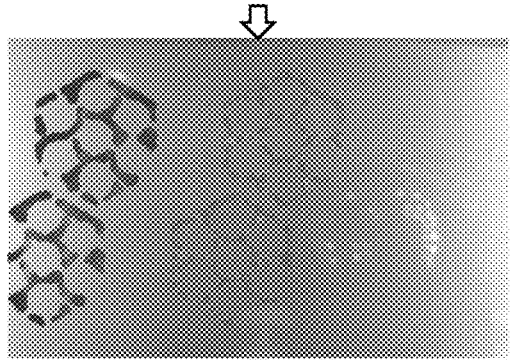
Figure 13C:
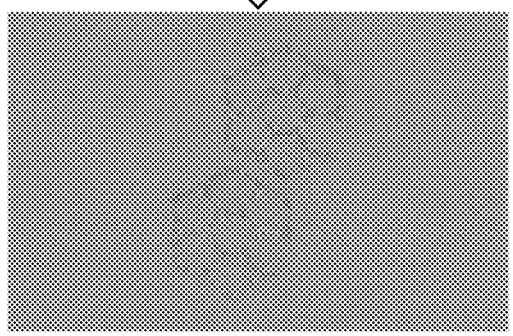

Forming the corrected displacement image proceeds by the following. An example of this process is illustrated by the images in FIGS. 13A-C. The as-captured image 730 is corrected for perspective and offset to form a first interim corrected image 740. The first interim corrected image 740 is then corrected for environmental conditions such as (i) reflections on the surfaces in the field of view, such as any glass surfaces and the surface of the transporting film 222, (ii) variations in coloration of the slurry 202, and (iii) any lighting gradients. Such correction can occur by normalizing based on the first image of the second slurry volume 570 (e.g., the "start of layer" image). It should be noted that the first image of the second slurry volume may also be corrected for perspective and offset, and the corrected first image of the second slurry volume may then be used as the baseline for correcting the displacement image for environmental conditions. The result of the corrections is a corrected displacement image 750.

Each layer deposited in an iterative process has at least one corrected void image 720 and at least one corrected displacement image 750, or alternatively, a plurality of corrected void images 720 and a plurality of corrected displacement images 750, which form a collection of corrected images associated with the manufacturing of the additive manufacturing product. Typically, one corrected void image 720 is paired with one corrected displacement image 750.

The collection of corrected images are then analyzed using thresholding. The thresholding classifies pixels in each image as either "dark" or "light" based on a threshold level applied on a regional basis based on nearest neighbors. The threshold range is automatically set by determining the mean and standard deviation of the grey-scale or color values of the uncured resin in the image (outside of the build area). The pixels in the build area are then classified as either "uncured resin" or "part" based on their difference from the mean. The "build area" is determined by masking out the bounding box surrounding the printed part geometry. Because this thresholding requires a greater difference from the mean to be classified as "part," this thresholding is more conservative for void images (as compared to displacement images) because the contrast is higher.

Image thresholding is used to classify pixels in the images as either "uncured resin" or "part". The thresholding process determines whether each pixel's data value (generally from 0-255) lies in a particular range. In the displacement images, displaced resin appears as either darker or brighter than the uncured resin slurry, which has a very uniform appearance. Similarly, in the void images, the voids appear darker than the uncured resin slurry, which has a uniform appearance. The differences in appearance allows classification by establishing an upper and lower threshold boundary condition on a pixel-by-pixel basis:

$$C_{Lower} < Pixel < C_{Higher}$$

Any pixel values which fall outside the above range, i.e., are less than or equal to $C_{Lower}$ or are greater than or equal to $C_{Higher}$, are considered to be "displaced" (for displacement images) or voids (for void images) and thus are resolved as "part".

Because of overlap between color values in color images, there may be some amount of error in the above method. To minimize such error, $C_{Lower}$ and $C_{Higher}$ are selected in a way that minimizes total error (as described below). Use of the above general equation provides a statistical method to determine the cured and uncured portions of the slurry on a binary basis, i.e., as either "uncured resin" or "part."

Figure 14A:
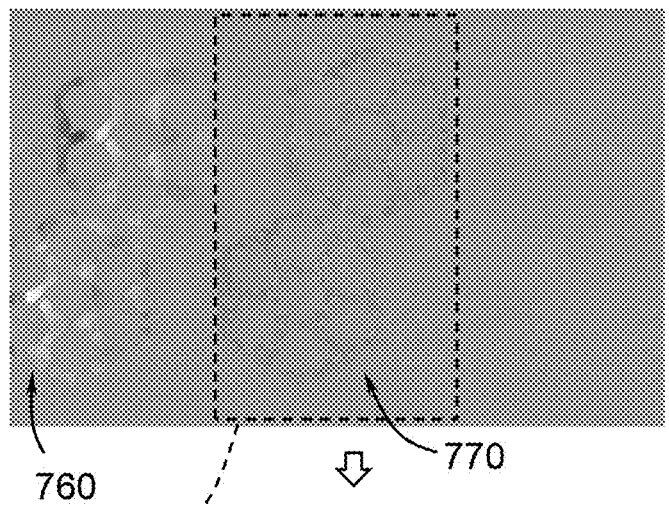
FIGS. 14A to 14D are images illustrating aspects of the thresholding process and FIG. 14E is an example of a pixel value frequency diagram used in the selection of constants $C_{Lower}$ and $C_{Higher}$ during the dynamic thresholding process.
Figure 14B:
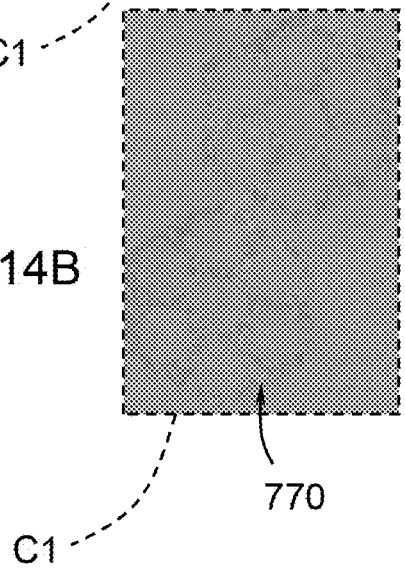
Figure 14C:
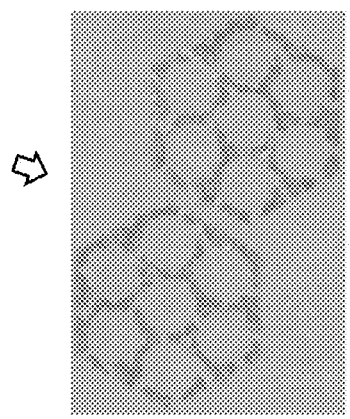
Figure 14D:
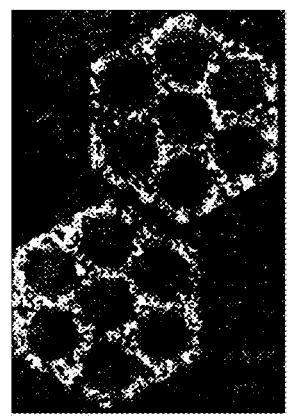
Figure 14E:
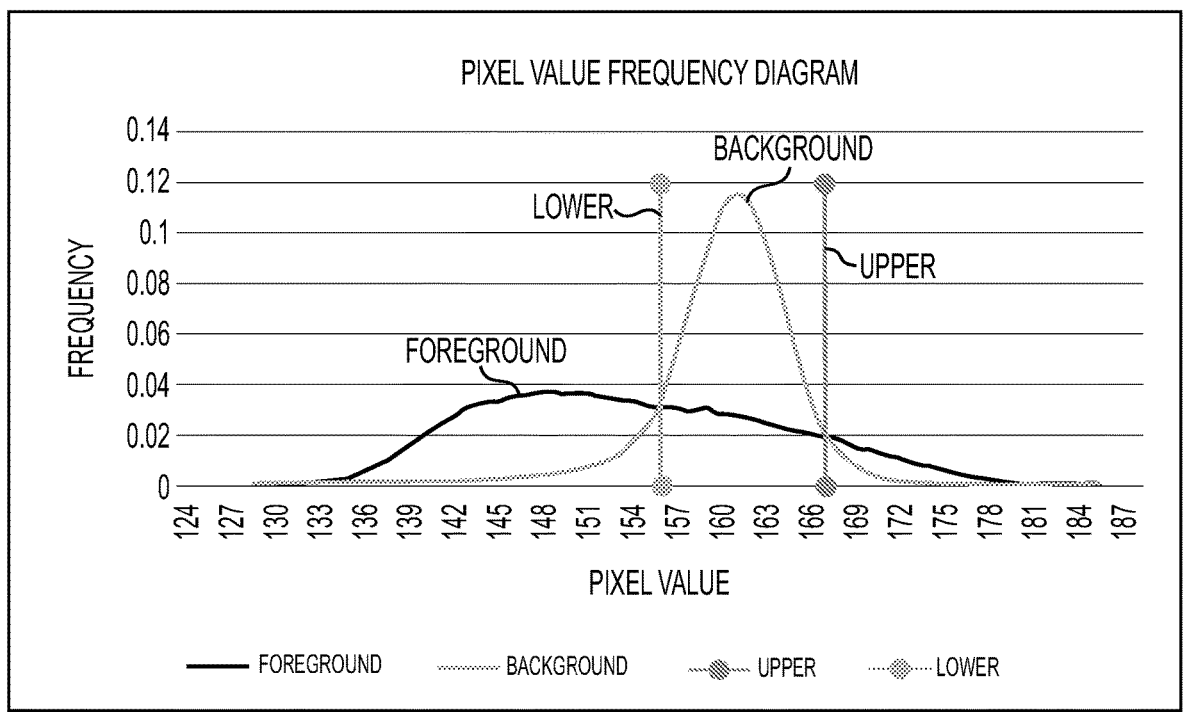

The constants $C_{Lower}$ and $C_{Higher}$ are determined algorithmically based on a displacement image. The process for determining the constants $C_{Lower}$ and $C_{Higher}$ crops a full displacement image to a reduced area that is determined by the geometry file and ensures that there will not be any image overlap with any previously built layers. For example and with reference to FIG. 14A to 14D, cropping results in artifacts from prior processes being outside the cropped area C1, such as the void artifacts 760 to the left of the image in FIG. 14A, while retaining the area to be analyzed within the cropped area C1, such as the area containing displacement artifacts 770 in the cropped image in FIG. 14B. Two samples are then taken of the cropped image—a foreground image and a background image, where foreground is the expected printed part and background is uncured, unexposed resin. These two samples are masked out using the expected geometry from the digital model data from, for example, a 3D model or another electronic data source such as a computer-aided design (CAD) model, an Additive Manufacturing File (AMF) file, or a stereolithography contour (SLC) file (usually in sequential layers). These models provide image "slices" defining the layer geometry the printer is commanded to print, which can be converted into a binary image. This image is overlaid onto the captured image to mask out areas which are expected to be printed, and areas which are not. The pixel values from the masked out areas are converted to value frequency diagrams using a binning method. FIG. 14C is an example of a masked image and FIG. 14E is an example of a pixel value frequency diagram. In the method, the number of pixels from each sample which are equal to a particular value from 0-255 are counted, and then the total counts are divided into the total number of pixels to provide a frequency value. The intersection of the graphed lines for foreground and background frequency determine the upper and lower thresholds for foreground by starting at the peak background value and iterating outwards on each side of the peak background value until the foreground frequency is greater than the background frequency. In the example shown in FIG. 14E, the upper threshold, i.e, $C_{Higher}$, is at a pixel value of 168 and the lower threshold, i.e., $C_{Lower}$, is ata pixel value of 156. Then, image pixel values that fall outside the threshold for "background," i.e. are less than the lower threshold or greater than the upper threshold, are classified as "foreground." When analyzing a color image, this process is done for each color channel separately and, in order to be classified as "foreground," all three color channels must fall outside the lower and upper thresholds for "background."

Continuing the thresholding process, pixels in the image are processed to be white or black and the analyzed image is converted into a binary image (based on black or white pixels) for further classification and use. FIG. 14D is an example of such a converted binary image.

Figure 15A:
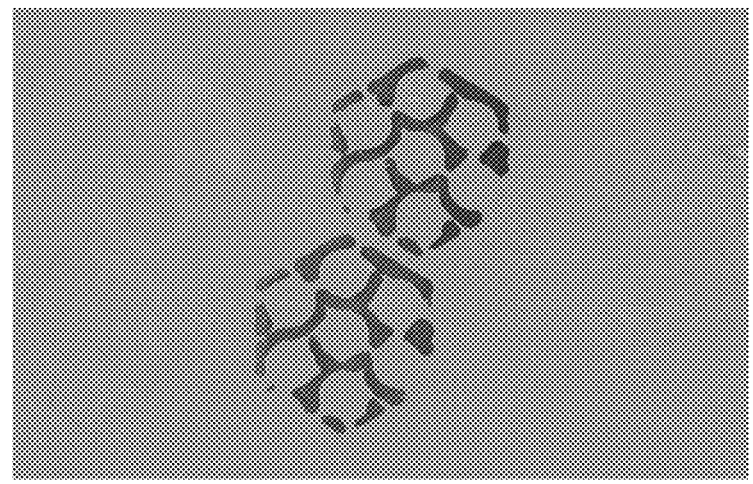
FIGS. 15A and 15B are images illustrating the effects of dynamic thresholding for void images.
Figure 15A:
Figure 15B:
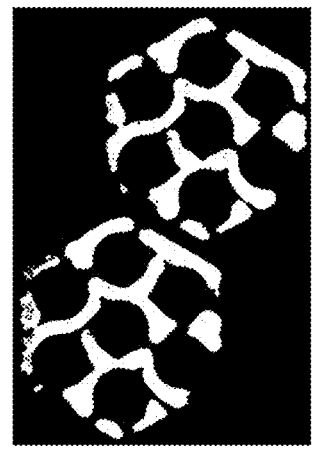
Figure 16A:
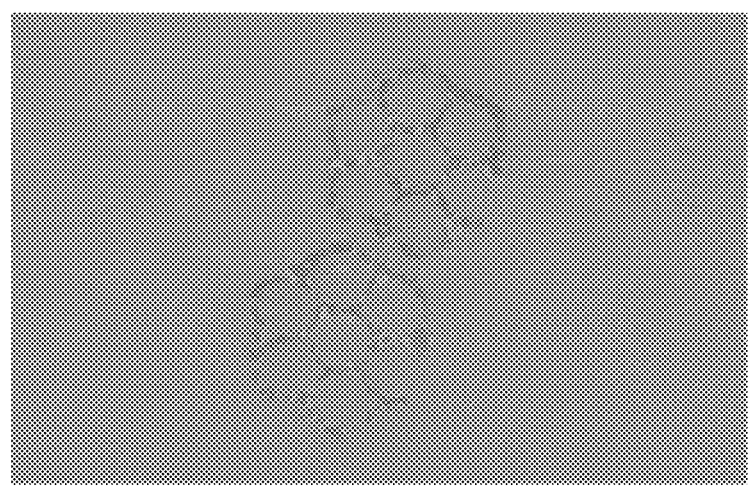
FIGS. 16A and 16B are images illustrating the effects of dynamic thresholding for displacement images.
Figure 16A:
Figure 16B:
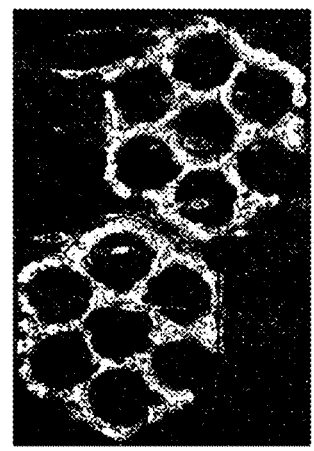

FIGS. 15A-B are images illustrating the effects of dynamic thresholding for void images. In particular, a corrected void image 800 is processed by dynamic thresholding resulting in a binary void image 810. FIGS. 16A-B are images illustrating the effects of dynamic thresholding for displacement images. In particular, the corrected displacement image 820 is processed by dynamic thresholding resulting in a binary displacement image 830.

It is additionally noted that the general equations and methods for thresholding can be applied using color-scale in place of gray-scale, in which case the general equations and methods are applied to each of the three color bands (red, green, and blue).

The binary void image and binary displacement image for each layer formed in the additive manufacturing process are then compared S570 to a binary expected image for that layer. The binary expected layer is based on a reference binary image. The reference binary image can be generated based on a CAD model or other input and corresponds to the input used to control the manufacturing of the layer by the additive manufacturing machine. Typically, as an electronic construct, the binary expected image has a higher resolution than any of the images captured by the image capture device 300. Alternative, the binary expected image can be based on sampling of actual additive manufacturing products. FIGS. 17A-D are example images used in the comparison process, including binary void image 850, binary displacement image 860, the binary expected image 870 associated with the layer corresponding to the binary void image 850 and the binary displacement image 860, and the comparison image 880 resulting from the pixel-to-pixel comparison 890. In the comparison 890, the binary image from both resin displacement and void detection are compared to the expected geometry at a pixel level. Small connected regions within the manufactured part are compared to provide a regional "confidence level."

One of multiple methods are used to segment the total build area into multiple regions that can be "present" or "not present." The "confidence level" is the ratio of pixels in a segment that are classified as "part" to the total number of expected pixels. If this ratio is sufficiently high (i.e. at least 50%, but this can change based on material and empirical experience), the entire segment is judged to be present. This method is used particularly when the pixel classifier is tuned to minimize false "part" detections, which will misclassify a fraction of the true "part" pixels as "uncured resin." Suitable segmentation methods include "by-contour" and "tiled." The "by-contour" method treats each contiguous region of expected part as a single segment. Because delamination defects have only rarely been observed to occur over partial sections of "contours," this method is suitable for detecting delamination defects. The tiled method breaks the expected part into square tiles, which enables the detection of partially adhered areas or smaller defects.

The default assumption of the comparison is "fail" (or "defect") unless one or more strong confidence level indicators are above a threshold value, in which case the connected region is considered as successfully adhered. Confidence levels can be implemented based on thresholding or other suitable techniques, such as computer vision methods or neural networks.

For example, the binary expected image typically includes one or more contiguous regions. When comparing the corrected void image to the binary expected image from the computer generated model, a percentage of coverage in the corrected void image can be quantified based on a pixel-level comparison within each contiguous region. The presence (or absence) of a manufacturing defect can be indicated based on a percentage of coverage below (or above) a threshold void image value in a portion of the additive manufacturing product corresponding to the contiguous region of the corrected void image. In one embodiment, the threshold void image value is 97% and a percentage of coverage less than 97% correlates to the presence of a manufacturing defect and a percentage of coverage equal to or greater than 97% correlates to the absence of a manufacturing defect. Similarly for comparing the corrected displacement image to the binary expected image from the computer generated model, a percentage of coverage in the corrected void image can be quantified based on a pixel-level comparison within each contiguous region. The presence (or absence) of a manufacturing defect can be identified S555 based on a percentage of coverage below (or above) a threshold displacement image value in a portion of the additive manufacturing product corresponding to the contiguous region of the corrected void image. In one embodiment, the threshold displacement image value is 97% and a percentage of coverage less than 97% correlates to the presence of a manufacturing defect and a percentage of coverage equal to or greater than 97% correlates to the absence of a manufacturing defect.

In some embodiments of the method, both the threshold void image value and the threshold displacement image value must be above a threshold to correlate to the absence of a manufacturing defect.

In other embodiments, because the void image provides more reliable information related to the condition of the as-manufactured layer, the threshold void image value being above the threshold is sufficient to correlate to the absence of a manufacturing defect, even if the threshold displacement image value is below the threshold. However, on the other hand, in such embodiments, the threshold void image value being below the threshold is sufficient to correlate to the presence of a manufacturing defect, even if the threshold displacement image value is above the threshold.

Figures 18A, 18B:
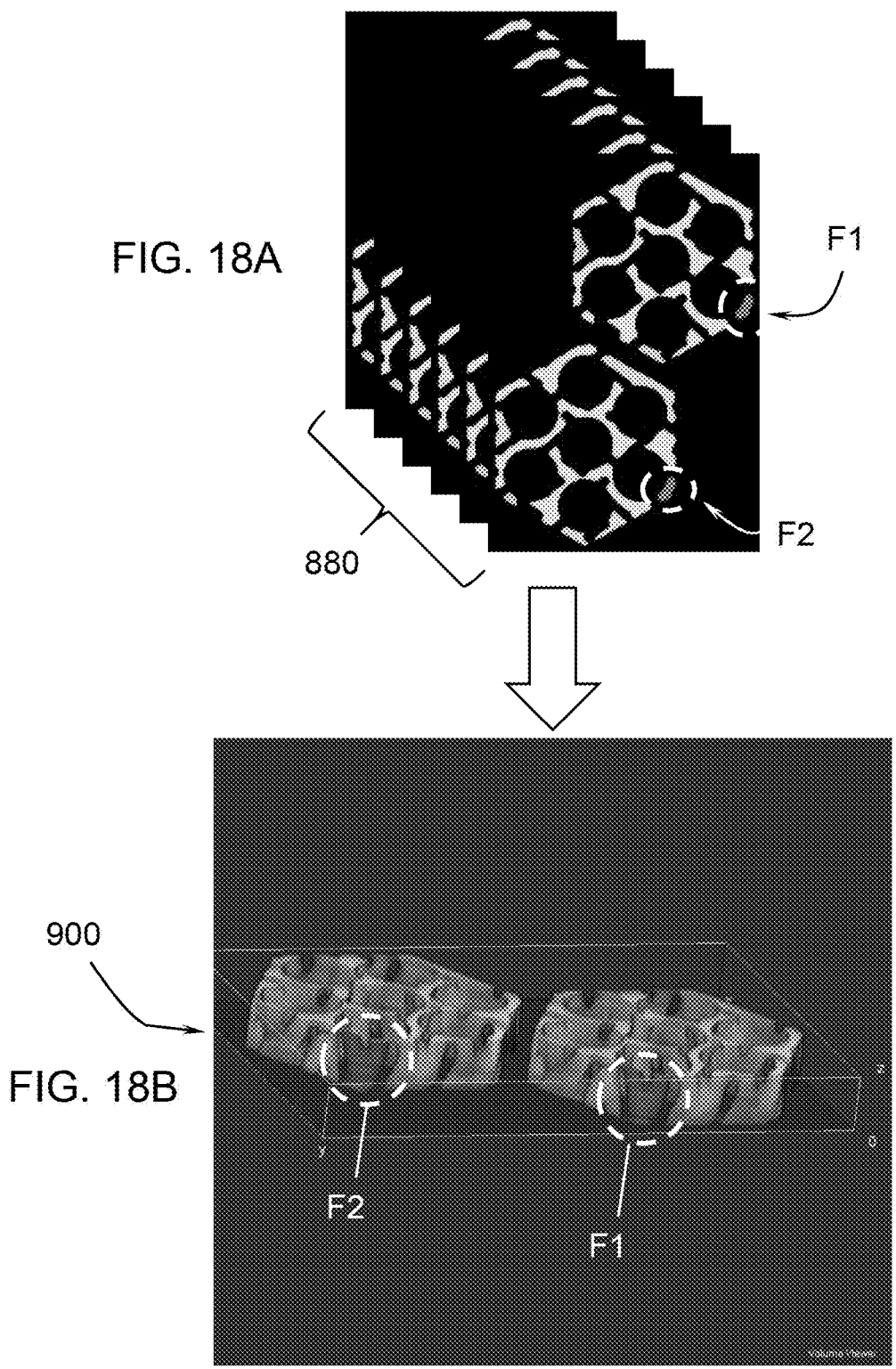
FIG. 18A is an example collection of comparison images and FIG. 18B is an assembled 3D rendering of the comparison images.
Figure 19:
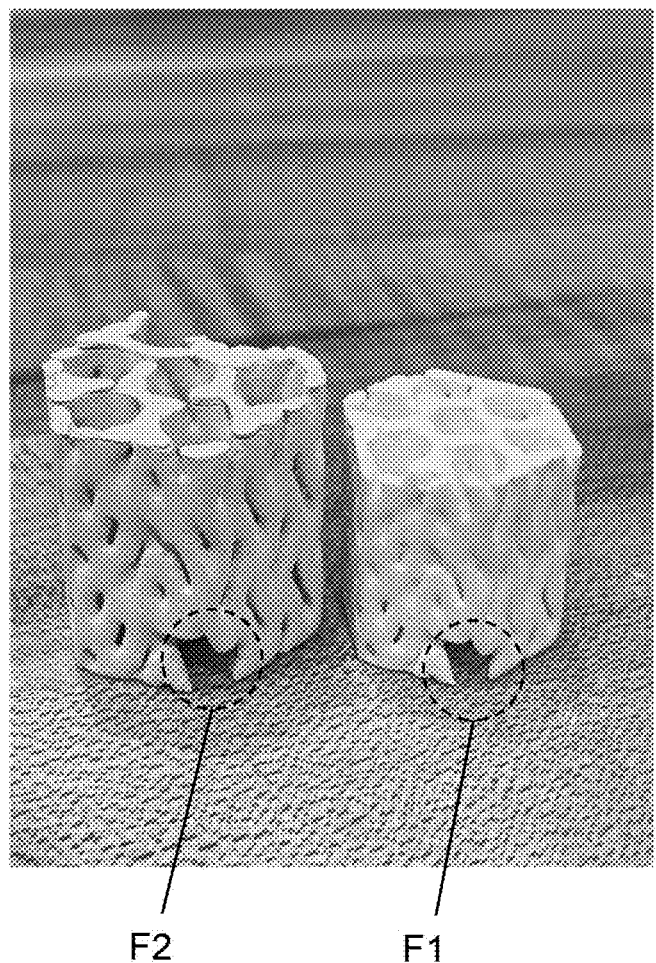
FIG. 19 is a photograph of an additive manufacturing prototype sample corresponding to the assembled 3D rendering in FIG. 18B.

In FIG. 17D, the regions labeled as F1 and F2 represent regions of the layer where the comparison resulted in a fail indication. Such a fail indication corresponds to a lack of deposited material, a failure to cure, a delamination, or some other failure in the additive manufacturing of that location in the layer. A plurality of comparison images can be collected and assembled into a 3D model corresponding to the as-manufactured additive manufacturing product or corresponding to at least a portion of the as-manufactured additive manufacturing product. FIG. 18A is an example collection of comparison images 880 (including fail regions F1 and F2) and FIG. 18B is an assembled 3D rendering 900 of the comparison images 880. In the 3D rendering 900, the fail regions F1 and F2 are visible. FIG. 19 is a photograph of an additive manufacturing prototype sample corresponding to the assembled 3D rendering 900 in FIG. 18B and clearly shows the fail regions F1 and F2. The ability to identify and visualize fail regions, such as F1 and F2, allows for failure detection. The failure detection can be remotely monitored and can be in-situ during the manufacturing process of post-manufacturing, such as when qualifying a manufactured part during quality controls.

The disclosed method also provides a method to detect pores within the additive manufacturing product. As previously noted herein, the presence of residual slurry within the perimeter of the void 290 may be indicative of manufacturing defects in the just-formed first layer ($L_n$). These manufacturing defects can be, for example, a pore in the body of the just-formed first layer ($L_n$), that leads to porosity in the just-formed first layer ($L_n$) and, over successive deposition processes, leads to porosity in the as-manufactured additive manufacturing product 10. To detect residual slurry that has the potential to become a pore, the analysis of a corrected void image can optionally detect residual that can become porous in printed layers. Knowing that pores in print layers cause isolated pockets of slurry to be left on the transporting film 222 within the area defining the void 290, any slurry detached from and not contiguous with the layer 220 within the perimeter of the void 290 that is not part of the expected geometry of the additive manufacturing product can be assumed to be evidence of a pore. This approach works regardless of the flow of the slurry itself (which may cover varying areas of the contour depending on viscosity) because any isolated drop of slurry cannot have been the result of flow after the deposition event.

Figure 20A:
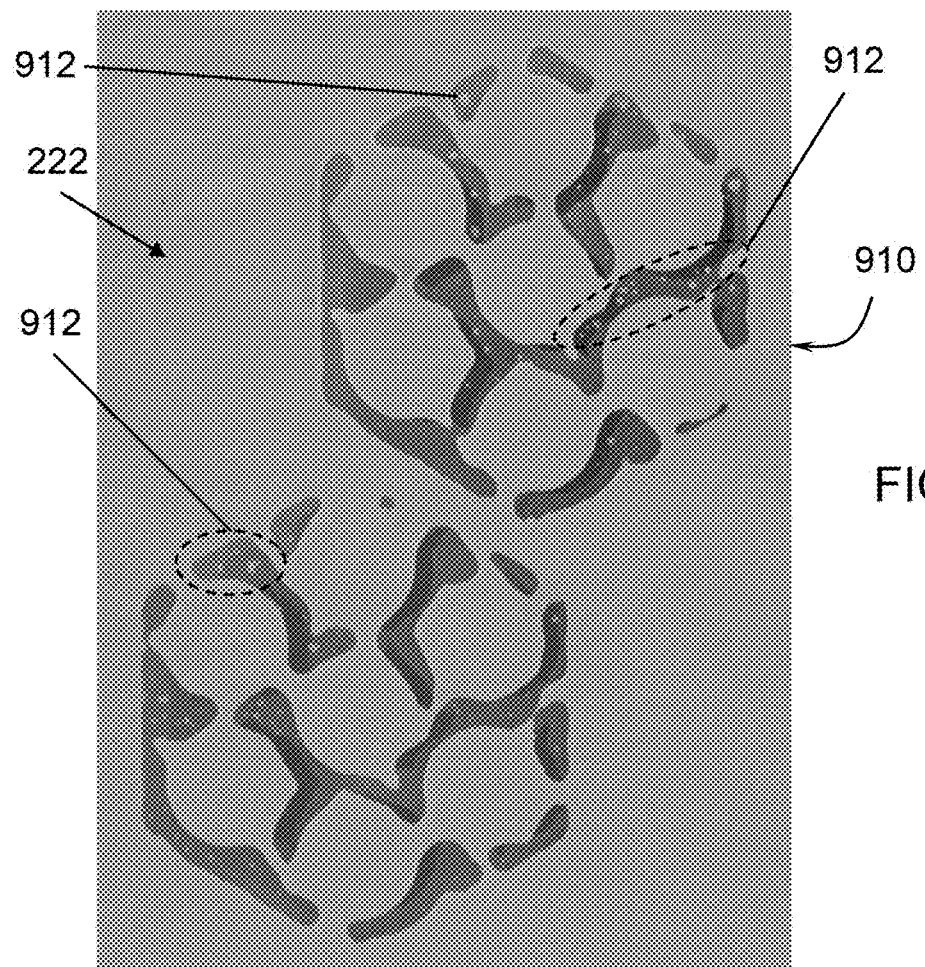
FIG. 20A is a magnified, corrected void image showing a plurality of residual slurry within the perimeter of the void
Figure 20B:
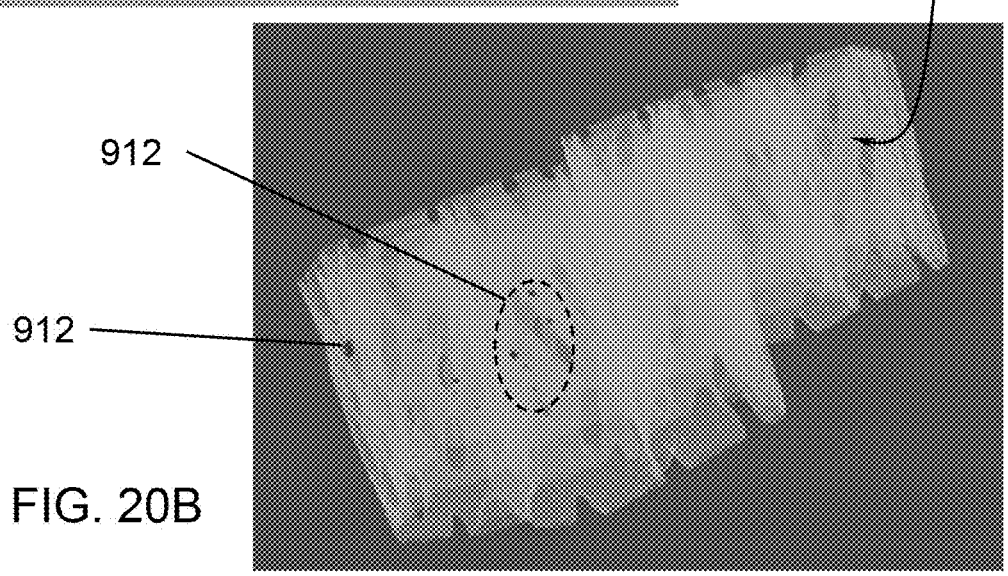
FIG. 20B is an image showing an example of a 3D defect model containing true pores.

FIG. 20A is a magnified, corrected void image 910 and shows a plurality of residual slurry 912 within the perimeter of the void 290. The residual slurry 912 is detached from and not contiguous with the layer 220. Image processing identifies residual slurry 912, typically in the form of drops, with a 30 micron resolution and determines which residual slurry 912 are disconnected from any potential slurry flow In embodiments of the process to classify the "pores", an image is classified as either "resin" or "void" using the threshold method previously described herein. Then, a "flood fill" algorithm seeded with "resin" is used to classify pixels that are outside of the expected part geometry to remove all connected "resin" classified pixels, including those inside the geometry. Then, all remaining pixels are assumed to be defects as they cannot have been the result of resin flow because they are not connected to the uncured resin. Once identified, residual slurry 912 is categorized as pore sites and the plurality of pore sites for one layer are cataloged. On a layer-by-layer basis, the catalogue of pore sites are compared and any pore sites which persist for more than three layers, alternatively more than one layer, are considered to be true pores. Furthermore, the true pores identified by this process can be incorporated into a 3D defect model. FIG. 20B is an image showing an example of a 3D defect model 920 containing true pores 922.

The true pores identified by this process enables quantification of total part density and identification of potential weak points in the as-manufactured part. The high degree of precision of identifying pores by this process has been confirmed by forensic analysis of an as-manufactured part. In particular, a 3D defect model of an as-manufactured part was created and a region of expected high porosity exposed, e.g., by slicing, and examined using a microscope. Pore locations observed using the microscope matched the pore location in the 3D defect model.

In some embodiments, the components 110 to control the additive manufacturing operation based on digital model data and to in-situ monitor the successive layers of the additive manufacturing product for manufacturing defects is embodied in a computer system or computer-aided machine, such as a computer controlled additive manufacturing machine. The computer system or computer portion of a computer-aided machine can be a general purpose computer, a special purpose computer, or a server that includes, among other things, non-transitory computer-readable storage medium including instructions for operating and controlling the additive manufacturing machine 100 and an electronic data source, such as a computer-aided design (CAD) model or an Additive Manufacturing File (AMF) file or a stereolithography contour (SLC) file (usually in sequential layers) related to the additive manufacturing product 10.

FIG. 21 is a block diagram illustrating an additive manufacturing machine (AMM) controller 1000 in accordance with some embodiments. The AMM controller 1000 typically includes one or more processing units (processors or cores) 1002, (optionally) one or more network or other communications interfaces 1004, memory 1006, and one or more wired or wireless connections 1008 for interconnecting these components. For example, such connections may include communication buses that optionally includes circuitry (sometimes called a chipset) that interconnects and controls communications between system components. Alternatively, the components may communicate wirelessly using wireless transceivers. The AMM controller system 1000 includes a user interface 1010. The user interface 1010 may include a display device 1012 and optionally includes an input device 1016, such as a keyboard/mouse, a trackpad, and/or input buttons. Alternatively, or in addition, the display device 1012 includes a touch-sensitive surface 1014, in which case the display device is a touch-sensitive display. The connections 1008 of the AMM controller system 1000 also operatively connects to and interfaces with the various sub-units that are communicably coupled to operate the additive manufacturing machine 100 to manufacture an additive manufacturing product. Thus, the connections 1008 of the controller system 1000 are operatively connected to and interface with components 102 to supply a source of material to a build zone (such as components associated with storing, supplying and transporting the slurry 202), components 104 on which the additive manufacturing product is built (such as build stage 250), components 106 to deposit or cure the material forming successive layers of the additive manufacturing product (such as curative radiation source 280), components 108 to image the liquid-based materials during deposition of successive layers of the additive manufacturing product (such as image capture device 300 and illumination source 310). Other components to control the additive manufacturing operation based on digital model data and to in-situ monitor the successive layers of the additive manufacturing product for manufacturing defects can also be included. Additionally, the various sub-units can be separate components or can be combined or otherwise share components.

The memory 1006 includes high-speed random-access memory, such as DRAM, SRAM, DDR RAM, or other random-access solid-state memory devices, and may include non-volatile memory, such as one or more magnetic disk storage devices, optical disk storage devices, flash memory devices, and/or other non-volatile solid-state storage devices. In some embodiments, the memory 1006 includes one or more storage devices remotely located from the processor(s) 1002. The memory 1006, or alternatively the non-volatile memory device(s) within the memory 1006, includes a non-transitory computer-readable storage medium. In some embodiments, the memory 1006 or the computer-readable storage medium of the memory 1006 stores instructions for executing the method(s) described herein (e.g., by a processor). For example, the memory stores the following programs, modules, and data structures, or a subset or superset thereof:

an operating system 1020, which includes procedures for handling various basic system services and for performing hardware dependent tasks;

a network communication module 1022, which is used for connecting the controller system 1000 to other computers via the one or more connections 1008 (wired or wireless) and one or more network communication interface 1004;

an image/video capture module 1024 (e.g., a camera module) for processing an image or video captured by the Imaging Components 108;

one or more AMM modules 1030, including the following modules (or sets of instructions), or a subset or superset thereof:

a slurry module 1032 for interfacing with and controlling operation of the slurry-related components within the components 102 to supply a source of material to a build zone, including the reservoir 200, (optionally) the valve 210, the metering device 212, and the interim reservoir 204;

a transporting film module 1034 for interfacing with and controlling operation of the transporting film-related components within the components 102 to supply a source of material to a build zone, including the transporting film 222 and rotatable rollers 216;

a build stage module 1036 for interfacing with and controlling operation of the build stage-related components within the components 104 on which the additive manufacturing product is built, including build stage 250 and wireless transceiver 258;

a curative radiation source module 1038 for interfacing with and controlling operation of the curative radiation source-related components within the components 106 to deposit or cure the material forming successive layers of the additive manufacturing product, including curative radiation source 280;

an imaging module 1040 for interfacing with and controlling operation of the imaging-related components within the components 108 to image the liquid-based materials during deposition of successive layers of the additive manufacturing product, including image capture device 300 and illumination source 310; and a digital model data module 1042 for interfacing with and controlling operation of components related to the storage, sharing, and accessing of electronic information related to the digital model of the part to be manufactured as well as the digital image information obtained from the image module; and one or more defect detection modules 1060, including the following modules (or sets of instructions), or a subset or superset thereof:

an image correction module 1062 and an image comparator module 1064 for, variously, (a) interfacing with image-related components and digital information and (b) controlling operation and application of various image processing functions, including the general equations for classification, perspective correction, and thresholding, and (c) the comparing of images and image-related data and information; and a product reconstruction module 1066 for interfacing with and controlling components related to the storage, sharing, and accessing of electronic information related to the digital model of the part to be manufactured as well as the digital image information obtained from the image module, and related to the correction and analyses of captured images, as well as the visualization of such information, for example, by computer aided three-dimensional rendering.

Each of the above identified modules corresponds to a set of executable instructions for performing one or more functions as described above and/or in the methods described in this application (e.g., the additive manufacturing methods, the computer-implemented methods, and other information processing methods described herein). However, these modules (e.g., sets of instructions) need not be implemented as separate software programs, procedures or modules, and thus various subsets of these modules are, optionally, combined or otherwise re-arranged in various embodiments. In some embodiments, the memory 1006 stores a subset of the modules and data structures identified above. In some embodiments, the memory 1006 stores additional modules and data structures not described above.

Suitable additive manufacturing equipment can be utilized that can accommodate the specific requirements for the materials to be used in the manufacture of the component (such as chemical resistance), the specific requirements for utilization of the equipment itself (such as specific atmospheric or vacuum requirements), as well as can accommodate the size and geometry of the manufactured component. Examples of suitable additive manufacturing equipment include SLA and DLP machines, electron-beam-based additive manufacturing equipment, and DLP stereolithographic equipment, any one of which can be modified or adapted for specific requirements Example methods of additive manufacturing can comprise providing a design of a component to be manufactured to a controller of an additive manufacturing equipment. Such a design can be incorporated into an additive manufacturing protocol.

The additive manufacturing protocol can be developed and/or adapted for use in any suitable additive manufacturing process. Examples of suitable additive manufacturing processes are disclosed in ISO/ASTM52900-15, which defines categories of additive manufacturing processes, including: binder jetting, directed energy deposition, material extrusion, material jetting, powder bed fusion, sheet lamination, and photopolymerization. The contents of ISO/ASTM52900-15 are incorporated herein by reference. Sterolithography is a form of additive manufacturing using photopolymerization processes. In example embodiments, stereolithographic additive manufacturing techniques include photoinitiation from exposure to ultraviolet radiation or beta radiation. In some example embodiments, the ultraviolet radiation is generated in a digital light processor (DLP) or in a stereolithography apparatus (SLA). In other example embodiments, the beta radiation is generated in electron-beam (EBeam) equipment or electron irradiation (EBI) equipment. Although the methods and compositions disclosed herein are described within the context of stereolithography, it is expressly contemplated that such methods and compositions can be extended to and or adapted to other additive manufacturing processes.

In another aspect of example methods, a supply volume of the slurry composition is established, such as a bath or reservoir. A base portion of a green body of the component is then formed by curing a portion of the slurry composition that is in contact with a movable base of the additive manufacturing equipment. Alternatively, a base portion can be pre-fabricated prior to the initiation of the additive manufacturing process. Additional portions of the green body of the component are formed on a layer-by-layer basis by, first, curing a portion of the slurry composition that is in contact with the base portion to form a first layer of a green body and then, second, curing a portion of the slurry composition that is in contact with the prior deposition layer of the green body to form the additional portions while translating the movable base relative to an interface between a surface of the supply volume and the most recently formed additional portion of the green body. The translation of the movable base is typically in accordance with the design of the component and as directed by the additive manufacturing protocol. In example embodiments, translating the movable base relative to the interface between the surface of the supply volume and the most recently formed additional portion of the green body has an X-axis resolution and a Y-axis resolution of 50 microns or better and has a Z-axis resolution of 20 microns or better. In example embodiments, each additional portion of the green body of the component formed on the layer-by-layer basis has a thickness of at least 25 microns, alternatively 25 microns to 50 microns. Once the layer-by-layer manufacture of the green body of the component is complete, the green body of the component can be removed from the additive manufacturing equipment and sintered (or processed by other debindering/consolidating techniques) to form a densified ceramic. The image capture, image correction, and image comparison process describe herein can be suitable incorporated into this method.

Based on one or more of the identified defects and/or other deviations, the additive manufacturing process or slurry compositions can be adjusted to correct, mitigate, or compensate for the defect and/or deviation. For example, constituents of the composition can be adjusted and varied (either the materials chemistry or the amounts of constituents). As another example, one or more parameters of the additive manufacturing technique can be adjusted and varied, such as movement of the build stage (spatially and temporally), temperatures associated with deposition, sequencing of steps, etc. Other process parameters that can be adjusted include parameters such as: increasing the temperature of the reservoir to higher temperatures, reducing viscosity, creating a more uniform layer thickness, adjusting the delay before irradiation to allow for proper leveling of an additive manufacturing print layer, adjusting movement speeds to allow for mitigation of hydraulic bearing forces and print window delamination, providing multiple exposures per layer to limit scattering and increase depth of cure, and continuously varying intensity exposures (movies) to optimize desired properties. Other design parameters that can be adjusted include parameters such as: altering the design for thin geometries that are below the capabilities to be printed, increasing/removing pores which are too small and can become occluded during exposure by scattering, adding drain or cleaning holes to the part to aid in trapped slurry removal, combining gyroid and lattice forms to support delicate geometry with structurally and neutronically useful material. The adjustments in composition and/or parameters can occur independently or in combination. Also, the adjustments in composition and/or parameters can be implemented in subsequent iterations of an in-progress iterative deposition process or in a subsequent iterative deposition process. Alternatively, the adjustment of a composition of the slurry or of a parameter of the additive manufacturing technique can be conducted to determine the effect of varying such composition/parameters. Information on such cause and effect can be developed and used in subsequent iterations of the in-progress iterative deposition process or in a subsequent iterative deposition process.

In some manufacturing methods or steps in manufacturing methods, features and structures (or portions thereof) of the additive manufacturing product are manufactured as an integral, unitary structure using, for example, an additive manufacturing process. As used herein, additive manufacturing processes include any technologies that build 3D objects by adding material on a layer-upon-layer basis. In one example, the disclosed methods can be applied for the manufacture of nuclear fission reactor structures and ancillary equipment. An example of a suitable additive manufacturing process utilizes 3-D printing of a metal alloy, such as a molybdenum-containing metal alloy, Zircaloy-4 or Hastelloy X, to form the noted structural features such as the cladding. In other embodiments, a fissionable nuclear fuel composition and/or the thermal transfer agent and/or the moderator materials and/or poisons used as part of the nuclear fission reactor structure can be included within the integral, unitary structure when suitable multi-material, additive manufacturing processes with multiple metals within the feedstock are employed. If the molten metal is not included in the additive manufacturing process, the additive manufacturing process can be paused, a volume of molten metal placed into the fuel cavity (either in liquid or solid form) and the additive manufacturing process continued to complete the structure of the closed chamber. Other alloys that can be used for fission reactor structures and ancillary equipment when employing suitable multi-material, additive manufacturing processes with multiple metals within the feedstock include: steel alloys, zirconium alloys, and molybdenum-tungsten alloys (for the cladding and/or for the containment structure); beryllium alloys (for the reflector); and stainless steel (for the containment structure). Even when not manufactured by an additive manufacturing process, the above materials can be used in manufacturing the various features and structures of such fission reactors and ancillary equipment.

Additive manufacturing techniques disclosed herein can include the additional steps of: (a) predictive and causal analytics, (b) in-situ monitoring combined with machine vision and accelerated processing during the layer-by-layer fabrication of the structure, (c) automated analysis combined with a machine learning component, and (d) virtual inspection of a digital representation of the as-built structure. In addition, additive manufacturing technology can create complex geometries and, when coupled with in-situ sensors, machine vision imagery, and artificial intelligence, allows for tuning of the manufacturing quality as the components are built on a layer-by-layer additive basis (often, these layers are on the scale of 50 microns) and provides predictive quality assurance for the manufacture of such reactors and structures.

Various materials can be used for additively manufacturing components of nuclear fission reactors and ancillary equipment For cladding, typically a corrosion-resistant material with low absorption cross section for thermal neutrons is used. Example materials include Zircaloy or steel, although other materials may be used if suitable to the reactor conditions, such as metallic and ceramic systems (Be, C, Mg, Zr, O, and Si), as well as compositions including molybdenum, tungsten, rhenium, tantalum, hafnium and alloys thereof, including carbides. For fissionable nuclear fuel, the composition can be high-assay low-enriched uranium (HALEU) which has a $U^{235}$ assay above 5 percent but below 20 percent or can be highly enriched uranium (HEU) with uranium that is 20% or more $U^{235}$. A suitable fissionable nuclear fuel composition applicable to the disclosed fuel element structure includes uranium oxide ($UO_2$) that is less than 20% enriched, uranium with 10 wt. % molybdenum (U-10Mo), uranium nitride (UN), and other stable fissionable fuel compounds. Burnable poisons may also be included. Typically, the fissionable nuclear fuel composition is in the form of a ceramic material (cermet), such as $UO_2$ with W or Mo and UN with W or Mo. When used, a thermal transfer agent, such as a salt or metal that will be molten at operating temperatures, can be included in the fuel element structure to improve thermal coupling between the fuel composition body and the cladding body. Additionally, a thermal transfer agent can occupy cracks or other defects in the fuel element structure (whether originally present or developing during reactor operation) to promote thermal coupling. Suitable molten metals for inclusion in the disclosed nuclear propulsion fission reactor structure and to be included in the fuel element structure to provide thermal transfer contact includes sodium (Na), sodium-potassium (NaK), potassium (K), and iron (Fe).

It will also be understood that, although the terms "first" and "second" are used herein to describe various elements, these elements should not be limited by these terms. These terms are used only to distinguish one element from another. For example, a first image could be termed a second image, and, similarly, a second image could be termed a first image, without departing from the scope of the various described embodiments. The first image and the second image are both images, but they are not the same image.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

Further, the terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "includes," "including," "comprises," and/or "comprising" when used in the specification, specify the presence of stated features, steps, operations, elements, and/or components, but do not preclude the presence or addition of one or more other features, steps, operations, elements, components, and/or groups thereof.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method to in-situ monitor production of an additive manufacturing product, the method comprising:
   obtaining a first baseline image of a slurry for additive manufacturing in a first volume of slurry in a build zone of an additive manufacturing machine;
   forming a layer of the additive manufacturing product via an additive manufacturing process;
   detecting one or more defects in the layer using a void detection technique;
   obtaining a second baseline image of the slurry in a second volume of slurry in the build zone of the additive manufacturing machine;
   detecting one or more defects in the layer using a displacement detection technique; and
   analyzing an output of the void detection technique and the displacement detection technique to identify a presence or an absence of a manufacturing defect in the additive manufacturing product,
   wherein the void detection technique includes:
   after forming the layer of the additive manufacturing product via the additive manufacturing process, withdrawing the additive manufacturing product from the first volume of slurry to a first withdrawn position, wherein, in the first withdrawn position, a last-formed layer is spaced apart from a plane containing a top surface of the first volume of slurry and spanning the build zone; and
   capturing a void image of the first volume of slurry in the build zone, wherein, in the void image, the additive manufacturing product is in the first withdrawn position and the first volume of slurry in the build zone is in a post-layer-formation condition that includes one or more voids in the first volume of slurry.

2. The method according to claim 1, wherein the displacement detection technique includes:
   immersing the additive manufacturing product into the second volume of slurry in the build zone, wherein, in a second immersed position, a surface of the last-formed layer is at a layer depth from the top surface of the second slurry volume, and wherein the layer depth is less than a thickness of the second volume of slurry in the build zone in an as-supplied condition; and
   capturing a displacement image of the second volume of slurry in the build zone, wherein, in the displacement image, the additive manufacturing product is in the second immersed position and the second volume of slurry in the build zone is in a pre-layer-formation condition that includes, relative to the second volume of slurry in an as-supplied condition, a reduced volume of slurry.

3. The method according to claim 2, wherein analyzing the output of the void detection technique includes a pixel-level comparison of a binary void image formed from the void image and a binary expected image associated with the layer corresponding to the binary void image, and wherein analyzing the output of the displacement detection technique includes a pixel-level comparison of a binary displacement image formed from the displacement image and a binary expected image associated with the layer corresponding to the binary displacement image.

4. The method according to claim 3, wherein the binary expected image includes one or more contiguous regions, wherein the pixel-level comparison occurs in each contiguous region, and wherein comparing the binary void image to the binary expected image quantifies a percentage of coverage in the binary void image based on the pixel-level comparison within each contiguous region.

5. The method according to claim 4, wherein absence of a manufacturing defect is indicated by the percentage of coverage being above a threshold void image value in a portion of the additive manufacturing product corresponding to the contiguous region of the binary void image.

6. The method according to claim 3, wherein the binary expected image includes one or more contiguous regions, wherein the pixel-level comparison occurs in each contiguous region, and wherein comparing the binary displacement image to the binary expected image quantifies a percentage of coverage in the binary displacement image based on the pixel-level comparison within each contiguous region.

7. The method according to claim 6, wherein absence of a manufacturing defect is indicated by the percentage of coverage being above a threshold displacement image value in a portion of the additive manufacturing product corresponding to the contiguous region of the binary displacement image.

8. The method according to claim 3, wherein the binary expected image includes one or more contiguous regions,
   wherein the pixel-level comparison occurs in each contiguous region,
   wherein comparing the binary void image to the binary expected image quantifies a first percentage of coverage in the binary void image based on the pixel-level comparison within each contiguous region, and
   wherein comparing the binary displacement image to the binary expected image quantifies a second percentage of coverage in the binary displacement image based on the pixel-level comparison within each contiguous region.

9. The method according to claim 8, wherein, for the contiguous region of the binary void image and the contiguous region of the binary displacement image that correspond to the same portion of the additive manufacturing product, absence of a manufacturing defect in the portion of the additive manufacturing product is indicated by the first percentage of coverage being above a threshold void image value and the second percentage of coverage being below a threshold displacement image value.

10. The method according to claim 8, wherein, for the contiguous region of the binary void image and the contiguous region of the binary displacement image that correspond to the same portion of the additive manufacturing product, presence of a manufacturing defect in the portion of the additive manufacturing product is indicated by the first percentage of coverage being below a threshold void image value and the second percentage of coverage being above a threshold displacement image value.

11. The method according to claim 1, wherein the manufacturing defect includes an adhesion defect in which material from the first volume of slurry has not adhered to the additive manufacturing product.

12. The method according to claim 1, wherein the additive manufacturing machine includes:
   a transporting film, wherein a first side of the transporting film supports the slurry for additive manufacturing and transports the slurry into and out from the build zone,
   a curative radiation source positioned to project curative radiation through the transporting film and into the slurry located in the build zone,
   an illumination source positioned to project visible light into the slurry in the build zone, and
   an image capture device positioned with a field of view that includes the build zone viewed through the transporting film.

13. The method according to claim 1, wherein analyzing the output of the void detection technique includes a pixel-level comparison of a binary void image formed from the void image and a binary expected image associated with the layer corresponding to the binary void image,
   wherein the binary expected image includes one or more contiguous regions, wherein the pixel-level comparison occurs in each contiguous region, and wherein comparing the binary void image to the binary expected image quantifies a percentage of coverage in the binary void image based on the pixel-level comparison within each contiguous region, and
   wherein absence of a manufacturing defect is indicated by the percentage of coverage being above a threshold void image value in a portion of the additive manufacturing product corresponding to the contiguous region of the binary void image.

14. A non-transitory computer-readable storage medium storing instructions for execution by a processor, the instructions comprising steps for:
   obtaining a first baseline image of a slurry for additive manufacturing in a first volume of slurry in a build zone of an additive manufacturing machine;
   forming a layer of the additive manufacturing product via an additive manufacturing process;
   detecting one or more defects in the layer using a void detection technique;
   obtaining a second baseline image of the slurry in a second volume of slurry in the build zone of the additive manufacturing machine;
   detecting one or more defects in the layer using a displacement detection technique; and
   analyzing an output of the void detection technique and the displacement detection technique to identify a presence or an absence of a manufacturing defect in the additive manufacturing product,
   wherein the void detection technique includes:
      after forming the layer of the additive manufacturing product via the additive manufacturing process, withdrawing the additive manufacturing product from the first volume of slurry to a first withdrawn position, wherein, in the first withdrawn position, a last-formed layer is spaced apart from a plane containing a top surface of the first volume of slurry and spanning the build zone; and
      capturing a void image of the first volume of slurry in the build zone, wherein, in the void image, the additive manufacturing product is in the first withdrawn position and the first volume of slurry in the build zone is in a post-layer-formation condition that includes one or more voids in the first volume of slurry.

\* \* \* \* \*